US009522487B2

(12) United States Patent
Sana et al.

(10) Patent No.: US 9,522,487 B2
(45) Date of Patent: Dec. 20, 2016

(54) DISASSEMBLING METHOD OF MANDREL USED FOR MANUFACTURING COMPOSITE MATERIAL STRUCTURE AND DISASSEMBLING APPARATUS OF MANDREL

(71) Applicant: KAWASAKI JUKOGYO KABUSHIKI KAISHA, Kobe-shi, Hyogo (JP)

(72) Inventors: Toshikazu Sana, Kakamigahara (JP); Naoki Tamura, Kakamigahara (JP); Tomoya Takahashi, Ibi-gun (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 127 days.

(21) Appl. No.: 14/679,803

(22) Filed: Apr. 6, 2015

(65) Prior Publication Data

US 2015/0224679 A1    Aug. 13, 2015

Related U.S. Application Data

(62) Division of application No. 13/518,927, filed as application No. PCT/JP2010/007393 on Dec. 21, 2010, now Pat. No. 9,021,678.

(30) Foreign Application Priority Data

Dec. 25, 2009 (JP) .................................. 2009-295577

(51) Int. Cl.
 *B29C 70/32* (2006.01)
 *B29C 33/48* (2006.01)
 (Continued)

(52) U.S. Cl.
 CPC ............. *B29C 33/485* (2013.01); *B29C 33/38* (2013.01); *B29C 33/3842* (2013.01);
 (Continued)

(58) Field of Classification Search
 CPC ...... B29C 33/3842; B29C 33/38; B29C 41/00; B29C 41/22; B29C 53/56; B29C 53/58; B29C 53/581; B29C 53/60; B29C 53/62; B29C 53/66; B29C 53/665; B29C 70/30; B29C 70/38; B29C 33/48; B29C 33/485; B29C 70/32; Y10T 29/53983; Y10T 29/53539; Y10T 29/49815; B62D 65/00; B21D 22/14; B21D 22/16; B64F 5/00; B64F 5/0009; B32B 27/00; B29D 30/245; B29D 20/12; B21C 47/30; B25H 75/22; B65H 75/242; B23B 31/40; B29L 2013/3082; Y02T 50/433; Y02T 50/43
 See application file for complete search history.

(56) References Cited

U.S. PATENT DOCUMENTS 1,835,986 A    12/1931 Heston
3,003,188 A    10/1961 Weiss
(Continued)

FOREIGN PATENT DOCUMENTS

JP    2-59328 A    2/1990
JP    5-24321 U    3/1993
(Continued)

OTHER PUBLICATIONS

Jan. 18, 2016 Search Report issued in European Patent Application No. 10838939.6.
(Continued)

*Primary Examiner* — David Bryant
*Assistant Examiner* — Jun Yoo
(74) *Attorney, Agent, or Firm* — Oliff PLC

(57) ABSTRACT

The present invention provides a technique which can disassemble a mandrel having a substantially cylindrical shape and being dividable into a plurality of segments, easily and efficiently. The disassembling method comprises, in the mandrel adhesively attached with a composite material structure on an outer peripheral surface thereof, a rotation step of rotating the pair of support rings along with the mandrel to position a segment which is a detached target to an uppermost portion; and a segment detaching step of detaching the segment which is the detached target positioned at the uppermost portion, from the pair of support rings; wherein in the segment detaching step, the segment which is the detached target is moved in a vertically downward direction to a position inside of the mandrel, between the pair of support rings, and is carried out from between the pair of support rings.

8 Claims, 24 Drawing Sheets

(51) Int. Cl.
  *B29C 33/38* (2006.01)
  *B64F 5/00* (2006.01)
  *B29L 31/30* (2006.01)

(52) U.S. Cl.
  CPC ..... *B64F 5/0009* (2013.01); *B29L 2031/3082* (2013.01); *Y10T 29/49815* (2015.01); *Y10T 29/53539* (2015.01); *Y10T 29/53983* (2015.01)

(56) References Cited

U.S. PATENT DOCUMENTS

| | | | |
|---|---|---|---|
| 4,436,574 A * | 3/1984 | Long | B29C 53/824 156/415 |
| 4,754,543 A * | 7/1988 | Spivy | B26D 3/16 279/2.1 |
| 7,125,237 B2 | 10/2006 | Buge et al. | |
| 8,303,758 B2 * | 11/2012 | Chapman | B29C 70/323 156/173 |
| 8,454,870 B2 | 6/2013 | Hollensteiner et al. | |
| 8,714,226 B2 | 5/2014 | Senibi et al. | |
| 2005/0039844 A1 | 2/2005 | Engwall et al. | |
| 2006/0118235 A1 | 6/2006 | Lum et al. | |
| 2006/0145049 A1 | 7/2006 | Blankinship | |
| 2006/0180704 A1 | 8/2006 | Olson et al. | |
| 2009/0112349 A1 | 4/2009 | Cobb et al. | |
| 2009/0217529 A1 | 9/2009 | Cerezo et al. | |
| 2010/0032862 A1 | 2/2010 | Micheaux et al. | |
| 2010/0083504 A1 | 4/2010 | Johnson et al. | |
| 2010/0223772 A1 | 9/2010 | Johnson et al. | |

FOREIGN PATENT DOCUMENTS

| | | |
|---|---|---|
| JP | 10-16085 A | 1/1998 |
| JP | 2007-532384 A | 11/2007 |
| WO | 2006/001860 A2 | 1/2006 |
| WO | 2006/137994 A1 | 12/2006 |
| WO | 2008/049975 A1 | 5/2008 |
| WO | 2009/018097 | 2/2009 |

OTHER PUBLICATIONS

International Search Report issued in International Patent Application No. PCT/JP2010/007393 on Feb. 8, 2011.

* cited by examiner

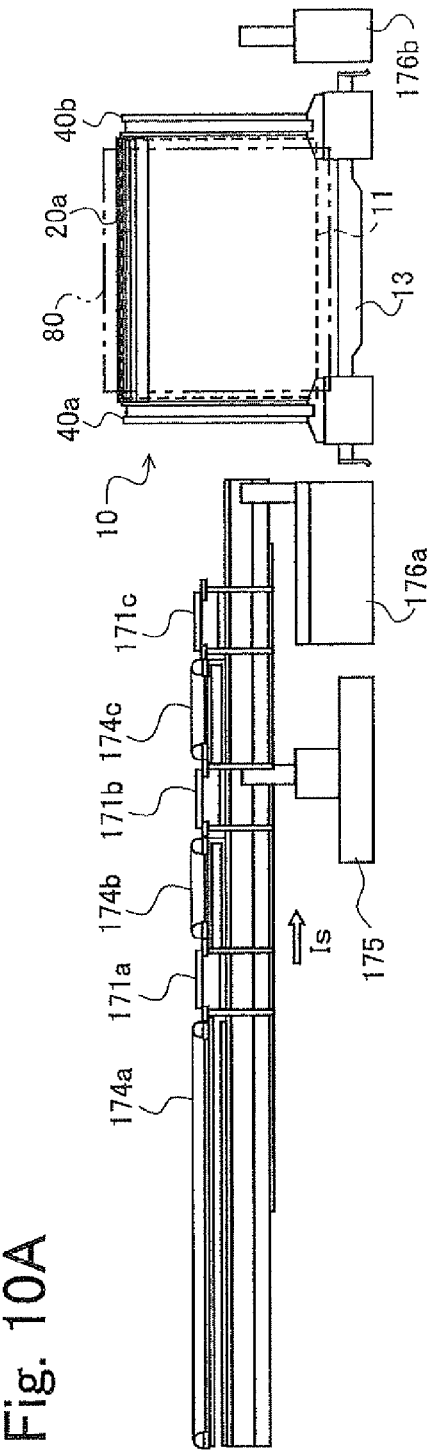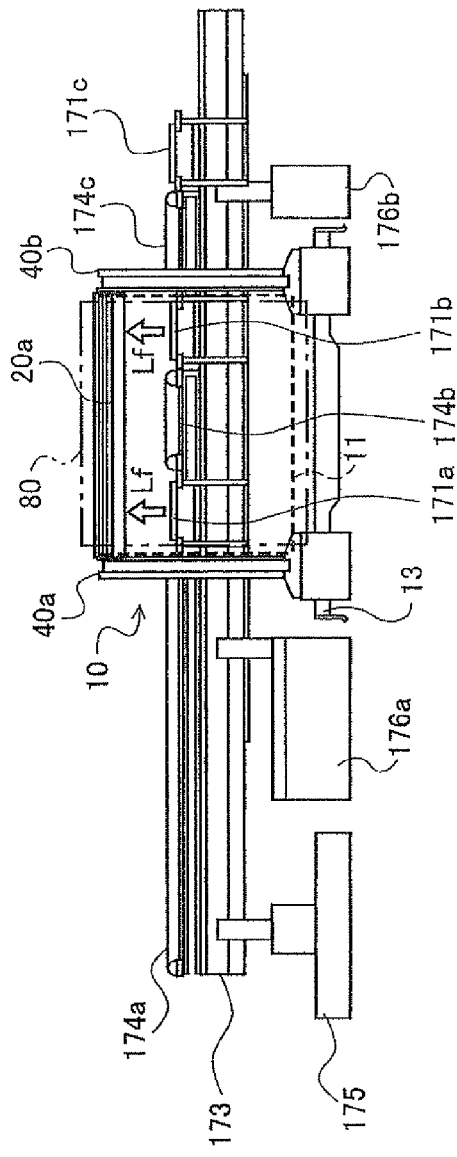
Fig. 10A
Fig. 10B

DISASSEMBLING METHOD OF MANDREL USED FOR MANUFACTURING COMPOSITE MATERIAL STRUCTURE AND DISASSEMBLING APPARATUS OF MANDREL

This is a Division of application Ser. No. 13/518,927 filed Jul. 20, 2012, which in turn is a National Phase Application of International Patent Application No. PCT/JP2010/007393 filed Dec. 21, 2010, which claims priority to Japanese Patent Application No. 2009-295577 filed Dec. 25, 2009. The disclosure of the prior applications are hereby incorporated by reference herein in their entireties.

TECHNICAL FIELD

The present invention relates to a disassembling method of a mandrel which is used for manufacturing a composite material structure using a fiber-reinforced resin composite material and is constructed of a plurality of segments assembled in a tubular shape, and a disassembling apparatus used in the disassembling method. Particularly, the present invention relates to a disassembling method of a mandrel suitably used for manufacturing a huge composite material structure for use as a fuselage of an aircraft, etc., and a disassembling apparatus of the mandrel.

BACKGROUND ART

In recent years, fiber-reinforced resin composite materials (hereinafter suitably referred to as "composite materials") have been widely used in fields in which metal materials have been used so far. Among the composite materials, carbon-fiber-reinforced composite materials which are formed such that carbon fibers used as reinforced fibers, are impregnated with matrix resin such as epoxy resin, have a smaller weight and a higher strength than metal materials. Because of this, the carbon-fiber-reinforced composite materials are widely used in fields of sport activity articles, industrial machines, and aerospace.

Among these fields, in the field of aerospace, for example, in structures such as wings or a fuselage of an aircraft, a stiffened panel in which a skin comprising a composite material is integrated with a stiffener which is a lightweight metal frame member, has been used. As a typical stiffener, there is a stringer. Stringers are combined to conform in shape to the structure and supported by jigs. Plural sheets of prepreg are laminated (stacked) together with the stringers, and the resulting laminate is pressurized and heated in an autoclave. As a result, the prepreg is cured into the skin, and the stiffeners are adhesively attached to and integrated with the skin, thereby forming a stiffened panel.

As an exemplary structure comprising the stiffened panel, as shown in FIG. 24, there is a fuselage 101 or the like of an aircraft which is formed as a one piece barrel (OPB). The fuselage 101 includes a skin 102 and a plurality of stringers 103 adhesively attached to the inner surface of the skin 102, and has an opening 104 which becomes a door when the fuselage 101 is assembled as the aircraft and openings 105 which become windows when the fuselage 101 is assembled as the aircraft.

As a technique for manufacturing the above stated structure of the aircraft, there is known a composite barrel section of an aircraft fuselage as disclosed in Patent Literature 1. According to this Patent Literature, the barrel section is defined as "an enclosed shell structure extending 360 degrees about an axis". To manufacture this barrel section, a mold configured such that a plurality of (e.g., six) tool segments are arranged in a cylindrical shape and supported by using tool fixtures.

Patent Literature 1 discloses as an exemplary manufacturing system of the composite barrel section, a plurality of manufacturing stations are laid out in series and a barrel section tool assembly (hereinafter referred to as a tool assembly) including the mold is introduced into each of the manufacturing stations.

To be specific, firstly, in a stiffener loading station, a plurality of stiffener grooves formed on the respective tool segments are loaded with a plurality of stiffeners, and then the tool segments are loaded into the tool fixtures and supported in a cylindrical shape, thereby forming a single mold (tool assembly in the same Patent Literature). At this time, the tool fixtures are rotatably supported on a tool support structure by means of a plurality of rollers such that the tool fixtures are rotatable along their longitudinal axis.

Then, the mold supported and constructed in the cylindrical shape is transported to a skin laminating station by a tool support structure. Here, the mold is rotated along the longitudinal axis, to laminate fiber tow (bundle of untwisted continuous filaments which is impregnated with thermosetting resin) by a fiber placement machine, thereby forming a laminate (corresponding to skin) on the outer periphery of the mold.

Then, the mold (tool assembly in the same Patent Literature) provided with the laminate is transported to a vacuum station by the tool support structure. Here, a pressure pad is installed on the outer periphery of the laminate, and a vacuum bag is installed on the periphery of the laminate to evacuate the vacuum bag. Then, the mold (tool assembly) attached with the vacuum bag is transported to a curing station by a gantry beam and is treated in an autoclave, to cure the laminate and the stiffener. In this way, the laminate and the stiffener are cured to form a stiffened panel on the outer periphery of the mold.

The mold (tool assembly) provided with the stiffened panel is transported to an inspection station by the gantry beam. The cured laminate (skin) is inspected to check whether or not it has voids or disbonds. Then, the cured laminate (skin) is transported to a trimming station by the gantry beam and subjected to trimming and drilling operations. Then, the tool segments are removed from the stiffened panel and the stiffened panel is returned to the stiffener loading station, and the stiffened panel (tool assembly) from which the tool segments have been removed is transported to a final assembly station by the tool support structure. The stiffened panel is attached with a plurality of frame sections, thereby completing a composite barrel section.

As described above, when the OPB is manufactured, the mandrel of a substantially cylindrical shape is used as the mold. The mandrel is configured in such a manner that a molded product (composite material structure) is molded on the outer peripheral surface thereof to form a hollow space of the OPB which is the molded product using the huge mold. To this end, the mandrel has a structure in which the mandrel is divided into a plurality of segments, for example, six segments, instead of a single huge tubular member. In this structure, the single huge mold need not be used, but the segments may be assembled as necessary. Therefore, this structure is useful in molding of the huge molded product such as the OPB.

CITATION LISTS

Patent Literature

Patent Literature 1: Translated PCT Application Publication No. 2007-532384

SUMMARY OF THE INVENTION

Technical Problem

Since the OPB which is the molded product is huge in size like the fuselage of the aircraft, it is difficult to detach from the molded product, the segments of the mandrel (mold) assembled in a cylindrical shape. This work is very messy.

For example, in the case of the fuselage of the aircraft, its dimension is extremely great, for example, its diameter is about 4 to 6 m, and a length of the cylindrical shape is about 5 to 15 m. The stiffened panel (skin and stiffener) constituting the fuselage has a very small thickness with respect to the overall fuselage. Therefore, the mandrel used for manufacturing the stiffened panel is substantially equal in dimension to the outer shape of the fuselage. As disclosed in Patent Literature 1, the segments (tool segments in the same Patent Literature) of the mandrel are manufactured using metal such as "steel, invar, aluminum, or composites". Therefore, the mandrel is detached from the hollow space of the OPB after the OPB is molded using the mandrel as the mold, the mold which is huge and metal-made is detached while preventing damage to the OPB. This work is not easy.

Since the mandrel is composed of the plurality of segments, a disassembling method for disassembling the mandrel into the segments may be used, when the mandrel is detached from the hollow space of the OPB. However, if the huge mandrel is disassembled into the plurality of segments, the segments themselves are huge and heavy.

In general, to disassemble a huge structure, using an overhead travelling crane, or the like, a large-sized constituent of the structure is lifted up in a suspended state and then moved horizontally to a predetermined location. However, as described above, the mandrel is in a state in which it is fitted into the hollow space of the molded product (OPB). Because of this, if the mandrel is disassembled into the segments and taken out of the hollow space by the method using the overhead travelling crane, it is necessary to draw out the segment from the hollow space of the molded product before the segment is lifted up in the suspended state. Therefore, there is a need for a work machine other than the overhead travelling crane. This results in complicated process steps in disassembling of the mandrel. Unless an appropriate work machine is used, the molded product might be damaged.

The present invention is directed to solving the above mentioned problem, and an object of the present invention is to provide a technique in which a mandrel which is a major component of a mold used for manufacturing a composite material structure such as a fuselage of an aircraft, has a substantially cylinder shape, and is dividable into a plurality of segments, can be disassembled easily and efficiently, without substantially affecting the molded product, for example, even when the mandrel is detached from the molded product.

Solution to Problem

To solve the above mentioned problems, according to the present invention, there is provided a disassembling method of a mandrel, which disassembles the mandrel including a plurality of segments assembled in a tubular shape, into individual segments, the plurality of segments having a substantially rectangular shape and being parts into which the mandrel is divided along a center axis direction, the mandrel being in a state in which the segments are joined together between a pair of support rings facing each other, the segments are each fastened to the support rings to form the tubular shape, and the mandrel is adhesively attached with a composite material structure on an outer peripheral surface thereof; the disassembling method comprising: a rotation step of rotating the pair of support rings along with the mandrel to position a segment which is a detached target to an uppermost portion; and a segment detaching step of detaching the segment which is the detached target positioned at the uppermost portion, from the pair of support rings; wherein in the segment detaching step, the segment which is the detached target is moved in a vertically downward direction to a position inside of the mandrel, between the pair of support rings, and is carried out from between the pair of support rings.

In accordance with this configuration, when the segment which is the detached target, is detached from the support ring, the segment is positioned at the uppermost portion of the support ring. When the segment is moved vertically downward from the uppermost portion, the detached segment is moved to inside of the mandrel. Therefore, the segment can be detached without substantially affecting the composite material structure formed on the outer peripheral surface of the mandrel. Inside of the mandrel, the segment is positioned between the pair of support rings. By horizontally moving the segment through the hollow space of the support rings, the segment can be carried out easily from between the support rings. The segment which is the detached target is moved to the uppermost portion which is a determined location, by rotating the support rings. In addition, the segment which is the detached target is moved only in the vertical direction. This makes it possible to easily detach all of the plurality of segments in the same step.

The disassembling method preferably comprises a segment separating step of, if the segment which is the detached target is joined to an adjacent segment, releasing a joined state between the segment which is the detached target and the adjacent segment, before the segment detaching step.

In accordance with this configuration, the segments remain fastened to the support rings after the segments are separated from each other firstly, and therefore the separated segments can be detached one by one. Thus, the mandrel can be disassembled efficiently.

In the disassembling method, preferably, in the segment detaching step, the segment which is the detached target is moved downward toward inside of the mandrel such that the segment is displaced downward while supporting at least portions of the segment having the substantially rectangular shape which portions are in the vicinity of four corners of the segment.

In accordance with this configuration, the segment which is the detached target is moved downward while individually changing the positions of the portions in the vicinity of the four corners of the segment. Therefore, attitude control and position control of the segment can be performed, when the segment is moved downward to inside of the mandrel.

In the disassembling method, preferably, in the segment detaching step, the segment which is the detached target is separated from an inner surface of the composite material structure in such a manner that one end portion of the segment which is the detached target is displaced downward before an opposite end portion of the segment which is the detached target such that the segment which the detached target is inclined.

In accordance with this configuration, since the segment which is the detached target is moved downward in a state in which it is inclined, instead of vertically, the segment can be separated from the composite material structure, by supplying air to a region between the segment and the composite material structure which are adhesively attached together. Therefore, the segment can be separated from the composite material structure efficiently without substantially deforming the composite material structure, for example.

In the disassembling method, preferably, in the segment detaching step, an annular fastening/guide mechanism provided between the support rings and the segment which is the detached target, guides the segment being moved downward, along the vertical direction.

In accordance with this configuration, since the annular fastening/guide mechanism guides the segment to move it in the downward direction, the segment which is the detached target can be prevented from contacting the support ring, or the like, during the downward movement of the segment which is the detached target.

In the disassembling method, preferably, in the segment detaching step, a segment joining/guide mechanism provided between the segment which is the detached target and a segment adjacent to the segment which is the detached target, guides the segment being moved downward, along the vertical direction.

In accordance with this configuration, since the segment joining/guide mechanism guides the segment to move it in the downward direction, the segment which is the detached target can be prevented from contacting the adjacent segment, or the like, during the downward movement of the segment which is the detached target.

In the disassembling method, preferably, in the rotation step, each of the support rings is supported from below on at least two locations sandwiching a vertical line passing through a center axis of the support ring and is applied with a rotational force; and each of the support rings is supported at an upper portion of the support ring such that movement of the support ring in a direction of the center axis is restricted.

In accordance with this configuration, since the support ring is supported at the upper and lower portions thereof such that the support ring is rotatable, the support ring can be rotated while preventing it from falling.

In the disassembling method, preferably, in the rotation step, a position detector section detects that a detected portion provided on each of the support rings has reached a predetermined detection position by rotation of the support ring, to determine that the segment which is the detached target is positioned at the uppermost portion of each of the support rings.

In accordance with this configuration, since it can be detected that the segment which is the detached target is positioned in the uppermost portion, according to the rotation of the support ring, the support ring which is rotated can be positioned accurately.

In the disassembling method, preferably, the plurality of segments include a first segment and a second segment which are different in shape, and an obverse surface of the second segment which is a part of an outer peripheral surface of the mandrel, has a greater area than an obverse surface of the first segment which is a part of the outer peripheral surface of the mandrel; the segment detaching step includes a first segment detaching step of detaching the first segment, and a second segment detaching step of detaching the second segment; and the first segment detaching step is performed before the second segment detaching step.

In accordance with this configuration, the first segment having the obverse surface with a smaller area is detached and then the segment having the obverse surface with a greater area is detached. Thus, the segment (first segment) having a smaller area which is easily detached is detached firstly and then the segment (second segment) having a greater area is detached in a state in which a work space is provided between the support rings. As a result, the mandrel can be disassembled more efficiently.

The present invention includes a disassembling apparatus suitably for use in the above disassembling method, in addition to the disassembling method of the mandrel. Specifically, the disassembling apparatus for use in the disassembling method of the mandrel of a mandrel of the present invention comprises a rail body inserted into a hollow space of the pair of support rings; a conveyor section provided on the rail body and configured to horizontally move the segment from a rear end of the rail body toward a tip end thereof; and a jack section provided on the rail body and configured to lift up the segment moved from the conveyor section, along a vertical direction; wherein the jack section includes segment support members which supports at least portions in the vicinity of four corners of the segment having the substantially rectangular shape and vertically displaces the portions independently along the vertical direction, between the support rings, in a state in which the rail body is inserted into the hollow space of the support rings.

The above and further objects, features and advantages of the invention will more fully be apparent from the following detailed description with reference to the accompanying drawings.

Advantageous Effects of the Invention

As described above, in accordance with the present invention, it is possible to disassemble a mandrel having a substantially cylindrical shape and being dividable into a plurality of segments, easily and efficiently.

BRIEF DESCRIPTION OF THE DRAWINGS

FIGS. 10A and 10B are side views of the precision rail showing the operation of the precision rail, which is performed when the first segment of FIG. 9 is detached.

Figure 1:
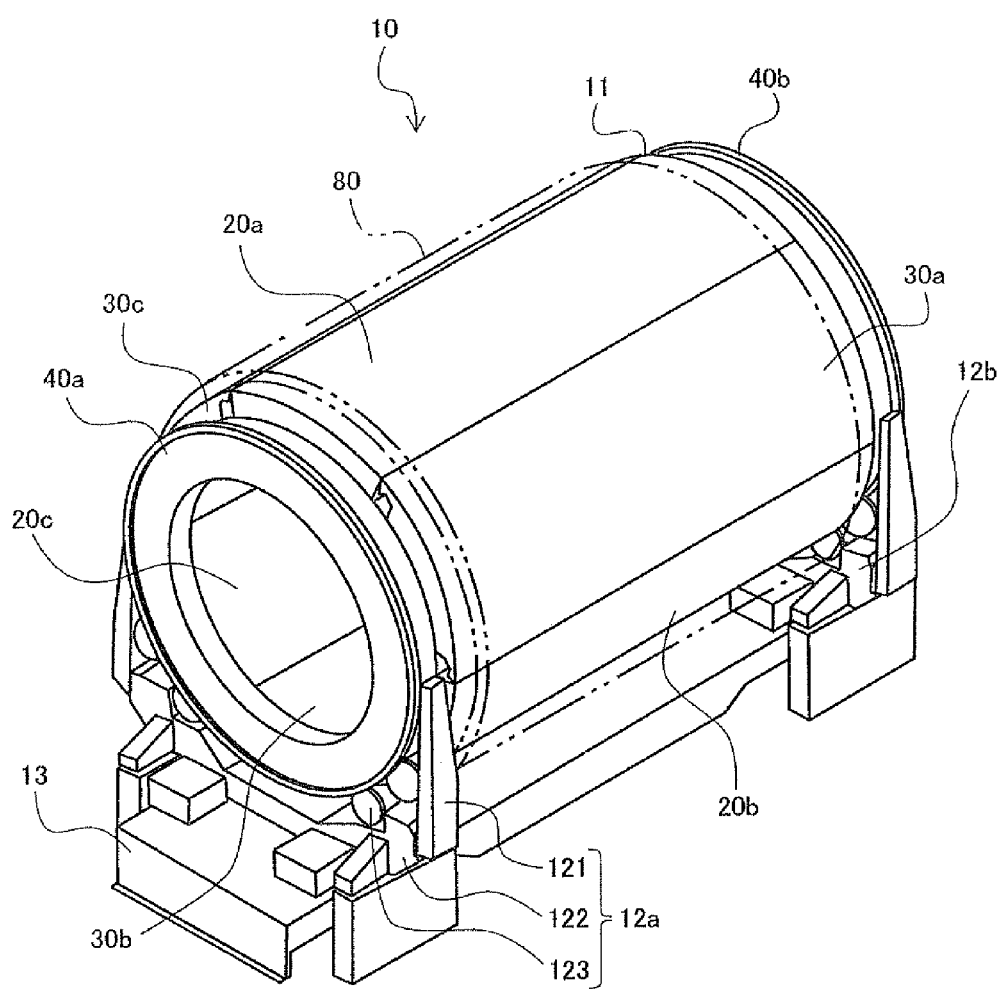
FIG. 1 is a perspective view showing an example of the overall configuration of a mold including a mandrel according to an embodiment of the present invention.

REFERENCE SIGNS LISTS 10 mold
11 mandrel
16 ring rotation drive section
17 precision rail (assembling/disassembling apparatus)
20, 20a to 20c first segment
21 obverse surface of first segment
30, 30a to 30c second segment
31 obverse surface of second segment
40, 40a, 40b support ring
42 female guide member (annular fastening/guide mechanism)
163 position detector section
171a to 171c jack section
171a-1, 171a-2 support rod member (segment support member)
171b-1, 171b-2 support rod member (segment support member)
252, 352 male guide member (annular fastening/guide mechanism)
262 outer peripheral female guide member (segment joining/guide mechanism)

DESCRIPTION OF EMBODIMENTS

Hereinafter, preferred embodiments of the present invention will be described with reference to the drawings. Throughout the drawings, the same or corresponding components are designated by the same reference numerals and repetitive description thereof will not be given.

[Overall Configuration of Mold]

First of all, the overall configuration of a mold used for manufacturing a composite material structure (hereinafter referred to as mold) which is disassembled by a disassembling method according to the present embodiment will be described with reference to FIG. 1. FIG. 1 is a perspective view showing an example of the overall configuration of a mold including a mandrel according to an embodiment of the present invention.

As shown in FIG. 1, a mold 10 of the present embodiment comprises at least a mandrel 11 and a pair of support rings 40a, 40b located at both ends thereof. The mandrel 11 includes six segments 20a, 30a, 20b, 30b, 20c, and 30c which are joined together at side surfaces thereof. The both ends of the mandrel 11 are supported by the support rings 40a, 40b, respectively. This allows the six segments 20a to 20c and 30a to 30c to maintain a cylindrical shape. Hereinafter, the segments 20a to 20c and 30a to 30c are referred to as "segments 20, 30," when they are described collectively.

As described later, channel-shaped concave portions are formed on the obverse surfaces of the segments 20, 30, to attach stringers thereto, respectively. In FIG. 1, the channel-shaped concave portions are not shown, to clearly show the overall configuration. The configuration of the segments 20, 30, and the support rings 40a, 40b will be described specifically later.

The support rings 40a, 40b are rotatably supported by cradles 12a, 12b, respectively such that they extend in an upright position. In the present embodiment, the cradle 12a for supporting the support ring 40a includes a pair of arm sections 121, a cradle body 122 and a plurality of support rollers 123 (four in FIG. 1). The pair of arm sections 121 are provided to extend in an upright position and sandwich the outer periphery of the support ring 40a in the upright position. The cradle body 122 is positioned under the support ring 40a and supports the arm sections 121 at both ends thereof. The support rollers 123 are placed between the cradle body 122 and the support ring 40a (40b) such that the support ring 40a (40b) is rotatable by an external force. Since the cradle 12b for supporting the support ring 40b has the same configuration, description thereof will not be given.

A carriage 13 is configured to carry the cradles 12a, 12b, the support rings 40a, 40b, and the mandrel 11. In the present embodiment, the carriage 13 has a rectangular flat shape, and is provided with a plurality of wheels on the lower surface of the carriage 13, although not shown FIG. 1. The carriage 13 is able to carry the cradles 12a, 12b, the support rings 40a, 40b, and the mandrel 11, with the mold 10 placed thereon. In the present embodiment, the carriage 13 has an upper surface having a greater area to correspond to the dimension (axial length of a cylinder and a diameter of a cylinder) of the mandrel 11. In the state of FIG. 1, the cradles 12a, 12b are not in contact with the carriage 13 and stand for themselves on a floor surface such that the height of the support rings 40a, 40b which face each other is horizontally adjustable.

The specific configurations of the cradles 12a, 12b and the carriage 13 are not limited to those disclosed in the present embodiment, and various configurations may be used so long as their advantages, functions and the like can be achieved.

The mold 10 is used for molding a composite material structure such as an OPB. The mandrel (cylindrical member) 11 which is a major constituent of the mold 10 serves as a molding core used in a state in which it is fitted into the hollow space of the composite material structure which is a molded product. Hereinafter, the composite material structure will be suitably referred to as the molded product.

Specifically, as shown in FIG. 1, a cylindrical molded product 80 indicated by a two-dotted line is molded to cover the outer peripheral surface of the mandrel 11. Therefore, when viewed from the molded product 80, the mandrel 11 is fitted into the hollow space of the cylindrical structure. Because of this, to detach the mandrel 11 from the molded product 80, as described later, the mandrel 11 is disassembled into the segments 20, 30. Note that the molded product 80 is adhesively attached to the outer peripheral surface of the mandrel 11 via a mold release layer as described later.

[Configuration of Segment]

Figure 2A:
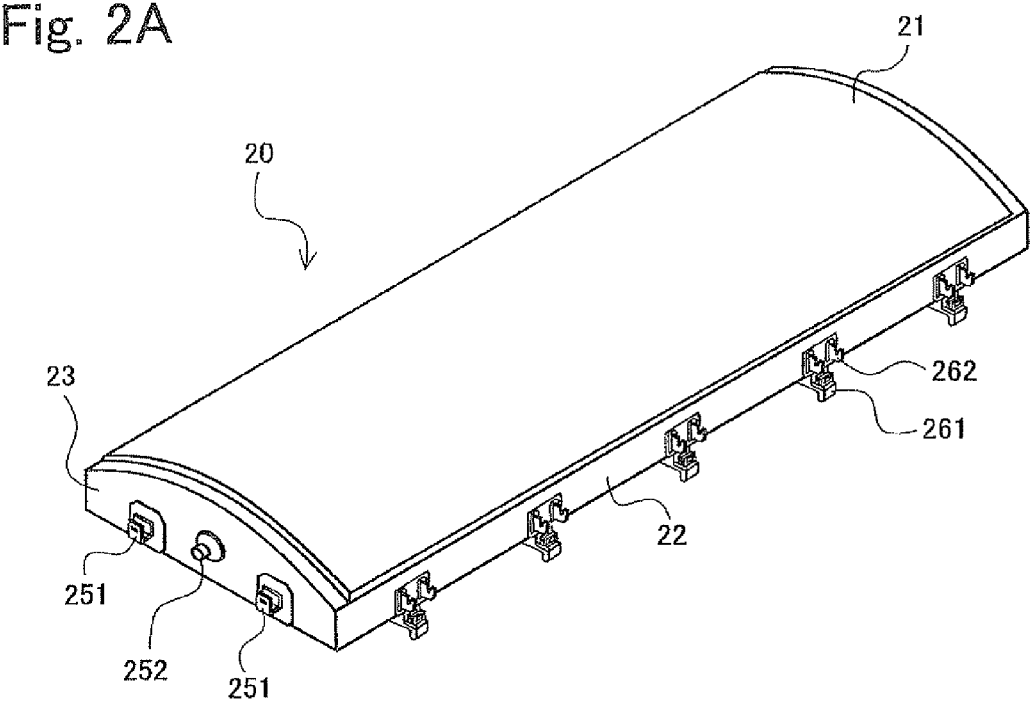
FIG. 2A is a perspective view showing the configuration of a first segment constituting the mandrel of FIG. 1.
Figure 2B:
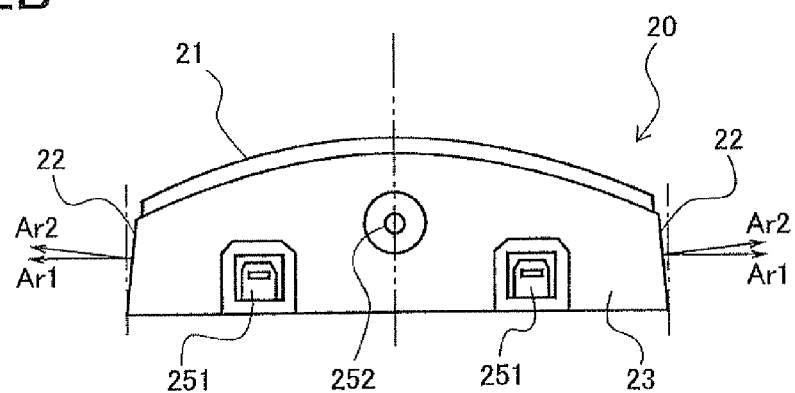
FIG. 2B is a plan view of the first segment of FIG. 2A when viewed from an end portion thereof.
Figure 3A:
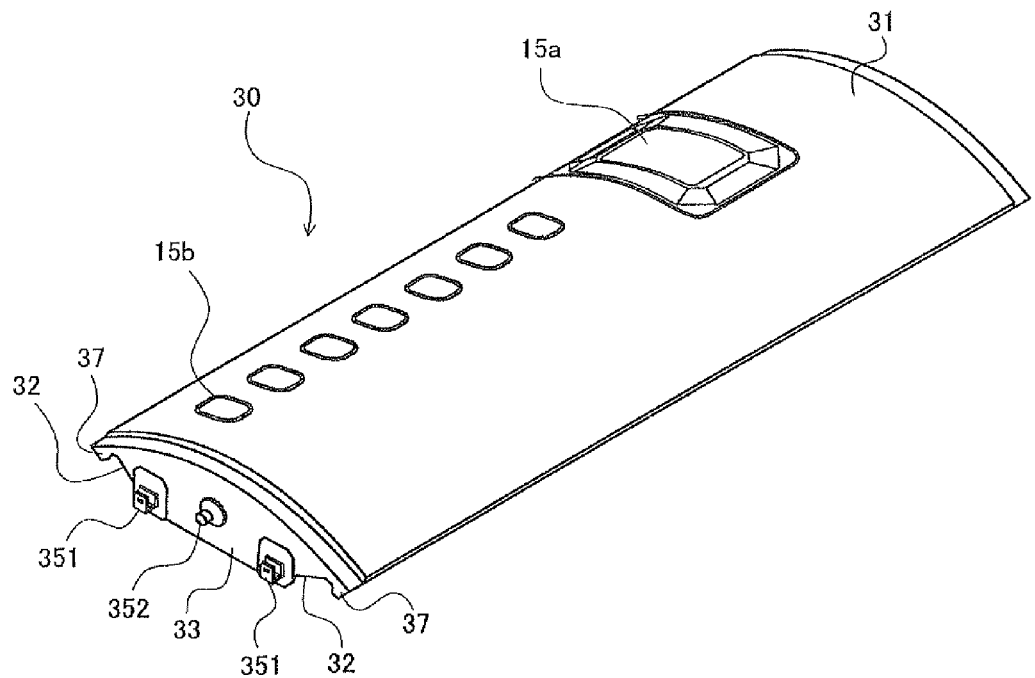
FIG. 3A is a perspective view showing the configuration of a second segment constituting the mandrel of FIG. 1.

Next, the six segments 20, 30 constituting the mandrel 11 will be described with reference to FIGS. 2A and 2B, and FIGS. 3A and 3B. FIG. 2A is a perspective view showing the configuration of a first segment constituting the mandrel 11 of FIG. 1, and FIG. 2B is a plan view of the first segment of FIG. 2A when viewed from an end portion thereof. FIG. 3A is a perspective view showing the configuration of a second segment constituting the mandrel 11 of FIG. 1, and FIG. 3B is a plan view of the second segment of FIG. 3A when viewed from an end portion thereof.

Figure 3B:
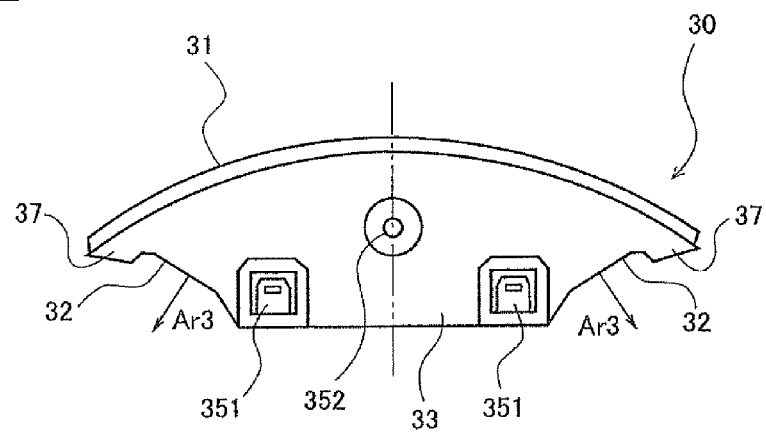
FIG. 3B is a plan view of the second segment of FIG. 3A when viewed from an end portion thereof.

In the present embodiment, the six segments 20a to 20c and 30a to 30c constituting the mandrel 11 are classified into the first segments 20a to 20c of FIGS. 2A and 2B, and the second segments 30a to 30c of FIGS. 3A and 3B, depending on their shapes. In description below with reference to FIGS. 2A to 2C and FIGS. 3A to 3C, the first segments 20a to 20c having the same shape are collectively referred to as "first segment 20," while the second segments 30a to 30c having the same shape are collectively referred to as "second segment 30."

The first segment 20 constituting the mandrel 11 and the second segment 30 constituting the mandrel 11, each of which has a substantially rectangular shape divided along a center axis direction. As shown in FIG. 2A, the first segment 20 entirely has a rectangular plate shape, an obverse surface 21 thereof is a convex-like curved surface (convex-shaped surface or convex-curved surface), and side surfaces 22 face a horizontal direction or a direction which is inclined upwardly with respect to the horizontal direction, in a state in which the first segment 20 is placed horizontally with the obverse surface 21 being on an upper side. In the present embodiment, for example, as shown in FIG. 2B, a normal-line direction of the side surface 22 faces the direction which is inclined upwardly, with respect to the horizontal direction.

As described later, in the present embodiment, when the mandrel 11 assembled in a cylindrical shape is disassembled, the first segments 20a to 20c are detached firstly one by one, and then the second segments 30a to 30c are detached one by one. The first segments 20 are each drawn out from between the second segments 30 joined to the side surfaces 22. Therefore, to allow the first segments 20 to be drawn out without any interference, it is required that the normal-line direction of the side surfaces 22 of the first segment 20 face the horizontal direction (arrow Ar1 direction of FIG. 2B). In other words, in the state where the first segment 20 is placed horizontally, the side surface 22 extends in a vertical direction (direction along one-dotted line of FIG. 2B).

As shown in FIG. 2B, the normal-line direction of the side surfaces 22 of the first segment 20 is inclined in the upward direction toward the obverse surface 21 (arrow Ar2 direction of FIG. 2B). The fact that the normal-line direction of the side surfaces 22 of the first segment 20 is inclined in the upward direction means that the side surfaces 22 are inclined to face in the upward direction. In other words, the side surfaces 22 are inclined such that an edge of the side surface 22 on the reverse side is outward relative to an edge thereof on the obverse side. The inclined side surfaces 22 form "draft" in the both side surfaces 22 of the first segment 20. Therefore, the first segment 20 is drawn out easily from between the second segments 30, and thus, the mandrel 11 is disassembled easily.

The inclination angle (draft angle) of the side surface 22 is not particularly limited. A suitable angle is set according to specific shapes or dimensions, etc., of the mandrel 11 and the mold 10. For example, in the present embodiment, the inclination angle (draft angle) of the side surface 22 is set to 8 to 12 degrees, preferably about 10 degrees. The side surfaces 22 facing each other may be inclined at an equal angle or different angles.

As shown in FIGS. 2A and 2B, on an end surface 23 of the first segment 20, there are provided male fastener members 251 for fastening the end surface 23 to a fastening surface (described later) of the support ring 40a (40b), and a male guide member 252 used for positioning fastener members when the first segment 20 is fastened. The male fastener members 251, female fastener members, and a fastened state retaining member (described later), which are provided on the fastening surface of the support ring 40a (40b), constitute an annular fastening/retaining mechanism. In addition, the male guide member 252, and a female guide member (described later) provided on the fastening surface of the support ring 40a (40b) constitute an annular fastening/guide mechanism.

The two male fastener members 251 are provided on the end surface 23. The male guide member 252 is positioned between the male fastener members 251. As shown in FIG. 2B, the male guide member 252 is positioned on a center line (two-dotted line in FIG. 2B) dividing the end surface 23 in a longitudinal direction in FIG. 2B (vertical direction in the state where the first segment 20 is placed horizontally). Therefore, the male fastener members 251 are positioned at an equal distance from the center line. The male guide member 252 is positioned closer to the obverse surface 21 than the male fastener member 251. This is because the male guide member 252 and the female guide member constituting the annular fastening/guide mechanism are brought into contact with each other firstly to position the fastener members constituting the annular fastening/retaining mechanism, when the first segment 20 is lifted up with the obverse surface 21 being on the upper side and fastened to the support ring 40a (40b).

As shown in FIG. 2A, on each of the side surfaces 22 of the first segment 20, there are provided a plurality of (five in FIG. 2A) male joining members 261, a plurality of outer peripheral female guide members 262, joining wedge members and inner peripheral male guide members, which are not shown in FIG. 2A. The male joining members 261 are positioned on the reverse side of the first segment 20, while the outer peripheral female guide members 262 are positioned adjacent to the male joining members 261 and closer to the obverse surface 21 than the male joining members 261. Joining wedge members are provided on the side surface 22 inward relative to the male joining members 261, and protrude outward of the side surface 22 when the first segment 20 is joined to the second segment 30, as described later. The inner peripheral male guide members are provided integrally with the underside of the male joining members 261, although not shown in FIG. 2A.

The male joining members 261, the joining wedge members, and the female joining members (described later) provided on the side surface of the second segment 30 constitute a segment joining/retaining mechanism. The outer peripheral female guide members 262 and outer peripheral male guide members (described later) provided on the side surface of the second segment 30 constitute a segment joining/guide mechanism. In the same manner, the inner peripheral male guide members and inner peripheral female guide members (described later) provided on the side surface of the second segment 30 constitute a segment joining/guide mechanism. In FIG. 2B, to make clear the positional relationship between the side surfaces 22, the male joining members 261, the outer peripheral female guide members 262, the inner peripheral male guide members, and the joining wedge members are not shown.

The male joining member 261 and the outer peripheral female guide member 262 have a positional relationship in which the outer peripheral female guide member 262 is located at the upper side (obverse surface 21 side) and the male joining member 261 is located at the lower side (reverse surface side) in the longitudinal direction in FIG. 2A (vertical direction in the state where the first segment 20 is placed horizontally). This is because, as in the case of the annular fastening/retaining mechanism, the segment joining/guide mechanism positions the segment joining/retaining mechanism, when the first segment 20 is lifted up, is inserted between the second segments 30, and they are joined together.

As will be described later, the inner peripheral male guide member is positioned under (on reverse surface side of) the male joining member 261 in FIG. 2A. It is important to position the side surfaces of the segments 20, 30 when they are joined together, because the mandrel 11 of a substantially cylindrical shape defined by the first segments 20 and the second segments 30 is required to have a smooth outer peripheral surface which is a circumferential surface. That is, when the side surfaces of the segments 20, 30 are joined together, the outer peripheral female guide members 262 and the outer peripheral male guide members perform positioning at the outer peripheral side, while the inner peripheral male guide members and the inner peripheral female guide members perform positioning at the inner peripheral side. This makes it possible to form the smooth circumferential surface while lessening unevenness on the outer peripheral surface of the mandrel 11.

Specific configuration, fastening method, joining method and guide method of the annular fastening/retaining mechanism, the annular fastening/guide mechanism, the segment joining/retaining mechanism, and the segment joining/guide mechanism, will be described later along with an assembling method of the mandrel 11. In the present embodiment, as described later, a clamp member provided on the side surface 22 is included in the segment joining/retaining mechanism. The clamp member will also be described later along with the assembling method of the mandrel 11. The obverse surface 21 of the first segment 20 is configured to allow the stringer to be attached thereto, although not shown in the drawings.

As shown in FIG. 3A, the second segment 30 entirely has a rectangular plate shape, an obverse surface 31 thereof is a convex-like curved surface (convex-shaped surface or convex-curved surface), and side surfaces 32 face a direction which is inclined downwardly with respect to the horizontal direction, in a state in which the second segment 30 is placed horizontally with the obverse surface 31 being on an upper side. That is, the side surfaces 32 are inclined such that the width of the second segment 30 increases from the reverse side toward the obverse surface 31.

As described later, in the present embodiment, when the mandrel 11 is disassembled, the first segments 20 are detached firstly. Therefore, the first segment 20 is drawn out from between the second segments 30 located at both side surfaces 22 thereof. Because of this, the second segments 30 which will be detached later preferably have a smaller area at its reverse side to prevent them from interfering with the first segment 20 which is being drawn out. In view of this, preferably, the side surfaces 32 of the second segment 30 are configured such that their normal-line direction (arrow Ar3 direction of FIG. 3B) faces in a downward direction, i.e., the side surfaces 32 are inclined in the downward direction.

Each of the side surfaces 32 of the second segment 30 has a shape in which an edge portion connected to the obverse surface 31 has an eave portion 37 protruding outward relative to the corresponding side surface 32. Therefore, as shown in FIGS. 3A and 3B, when the second segment 30 is seen from the obverse surface 31, the side surface 32 facing downward is completely hidden by the eave portion 37.

The second segment 30 is provided on each of the side surfaces 32 below the eave portion 37, with a female joining member (as described later) constituting the segment joining/retaining mechanism, and the outer peripheral male guide member and the inner peripheral female guide member constituting the segment joining/guide mechanism. In FIG. 3B, to easily describe the positional relationship between the side surfaces 32, the female joining member, the outer peripheral male guide member, and the inner peripheral female guide member are not shown. These will be described later along with the assembling method of the mandrel 11.

The degree to which the side surface 32 is inclined downward, and the degree to which the eave portion 37 protrudes outward are not particularly limited. They are suitably set based on the specific configuration of the mandrel 11, the specific configuration of the second segment 30, or the specific configuration of the first segment 20 joined to the second segment 30.

Like the end surface 23 of the first segment 20, on an end surface 33 of the second segment 30, two male fastener members 351 for fastening the end surface 33 to a fastening surface of the support ring 40a (40b) and one male guide member 352 are provided to have the same positional relationship as that between the male fastener members 251 and the male guide member 252. Like the male fastener members 251, the male fastener members 351 constitute the annular fastening/retaining mechanism, while the male guide members 352 constitute the annular fastening/guide mechanism like the male guide members 252.

As shown in FIG. 3A, the second segment 30 has a door frame portion 15a and window frame portions 15b. The door frame portion 15a corresponds to a door in the OPB formed using the mold 10 of the present embodiment, while the window frame portions 15b correspond to windows in the OPB. The door frame portion 15a and the window frame portions 15b are concave-convex portions used for cutting and perforation in a trimming process. Although in the present embodiment, the door frame portion 15a and the window frame portions 15b are formed on the obverse surface 31 of the second segment 30, the present invention is not limited to this. The door frame portion 15a and the window frame portions 15b may be formed on the obverse surface 21 of the first segment 20 or on both of the first segment 20 and the second segment 30. Although not shown, the stringer is attachable on the obverse surface 31 of the second segment 30.

[Configuration of Support Ring]

Figure 4A:
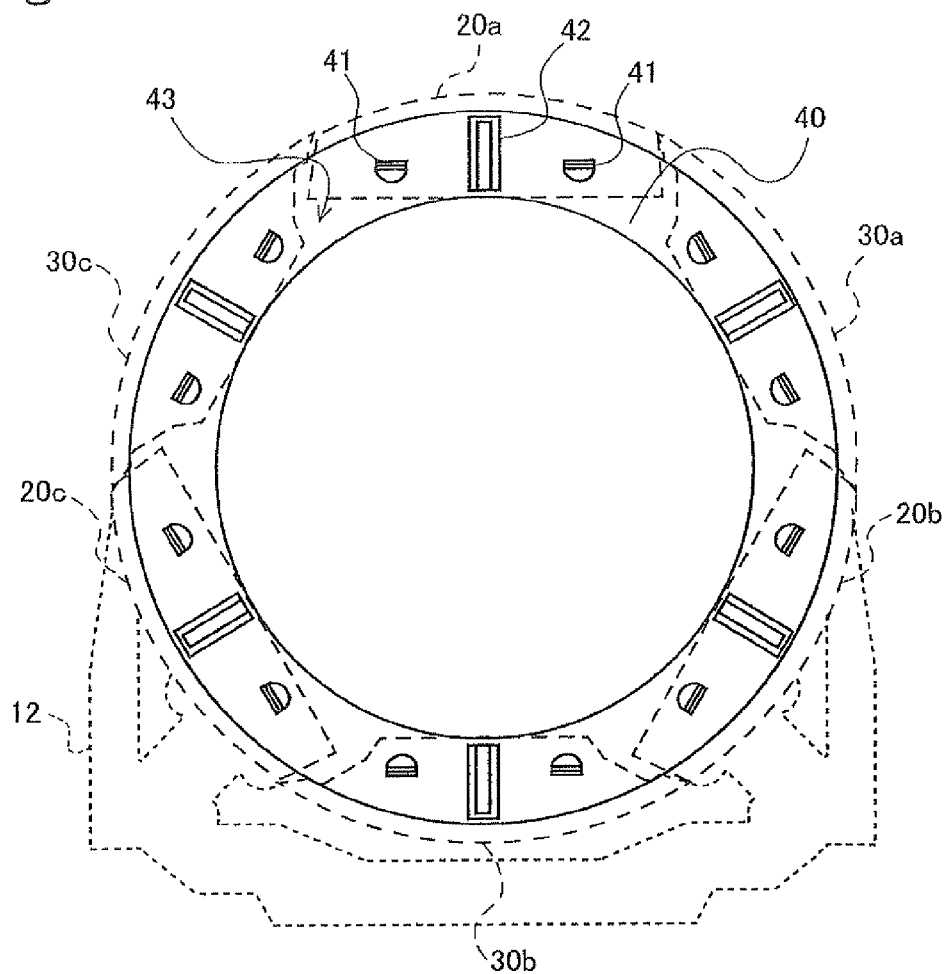
FIG. 4A is a plan view showing an example of the configuration of a support ring supporting the mandrel of FIG. 1 at both ends thereof.
Figure 4B:
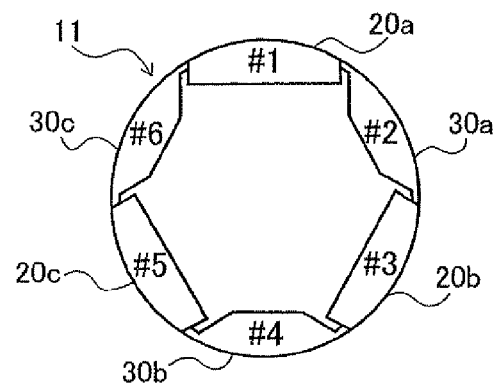
FIG. 4B is a schematic end view of the mandrel showing a positional relationship between segments retained by the support ring of FIG. 4A.

Next, a description will be given of the configuration of the support rings 40a, 40b which are retaining members for retaining the segments 20, 30 as the single cylindrical mandrel 11, and a positional relationship of the segments 20, 30 fastened to the support rings 40a, 40b, with reference to FIGS. 4A and 4b. FIG. 4A is a plan view showing an example of the configuration of the support rings 40a, 40b supporting the mandrel 11 at both ends, and FIG. 4B is a schematic end view of the mandrel 11 showing a positional relationship between segments 20, 30 retained in the cylindrical shape by the support rings 40a, 40b.

In description below, with reference to FIG. 4A, the support rings 40a, 40b having substantially the same configuration are collectively referred to as "support ring 40." In the same manner, the cradles 12a, 12b for supporting the support rings 40 are collectively referred to as "cradle 12."

As shown in FIG. 1, the support rings 40a, 40b for supporting the mandrel 11 configured as described above have an oval annular shape. The support rings 40a, 40b are positioned to face to each other, and are supported by cradles 12a, 12b in an upright position. As shown in FIG. 4A, opposing surfaces of the support rings 40a, 40b are fastening surfaces 43 for fastening the end surfaces of the mandrel 11. In FIG. 4A, the outline of the cradle 12 is indicated by a dotted line.

As shown in FIG. 4A, the fastening surface 43 is provided with two female fastener members 41 and one female guide member 42 provided between them, on location (fastening portion) to which each of the first segments 20a to 20c or each of the second segments 30a to 30c is fastened. In the present embodiment, there are six segments 20, 30, and therefore, six fastening portions are provided on the fastening surface 43. The fastening portion of the first segment 20 and the fastening portion of the second segment 30 are set alternately in the circumferential direction of the support ring 40.

The female fastener members 41 are members into which the male fastener members 251 of each of the first segments 20a to 20c constituting the mandrel 11 or the male fastener members 351 of each of the second segments 30a to 30c constituting the mandrel 11 are inserted to fasten each of the first segments 20a to 20c or each of the second segments 30a to 30c to the fastening surface 43 of the support ring 40. The female fastener members 41, and the male fastener members 251, 351, constitute the annular fastening/retaining mechanism. Although not shown in FIG. 4A, fastening wedge members as a fastened state retaining member for retaining the above fastened state are provided on the fastening surface 43.

The female guide member 42 is a member into which the male guide member 252 of each of the first segments 20a to 20c or the male guide member 352 of each of the second segments 30a to 30c is inserted, to guide the male fastener member 251(351) to be inserted into the female fastener member 41. The female guide member 42 and the male guide members 252, 352 constitute the annular fastening/guide mechanism. For example, as shown in FIG. 4A, the female guide member 42 is a pair of rail-like members extending radially from a center side toward outside of the support ring 40a (40b). The inner end portion of the support ring 40 is open between the rails, while the outer end portion thereof is closed between the rails. The male guide member 252 (352) is inserted into a recess portion between the rails to serve as the annular fastening/guide mechanism.

The positions of the female fastener members 41 on the fastening surface 43 correspond to the male fastener members 251, 351 provided on the end surfaces 23 of the first segments 20a to 20c and on the end surfaces 33 of the second segments 30a to 30c. For example, the male fastener members 251 of each of the first segments 20a to 20c are positioned at an equal distance from the male guide member 252 positioned on the center line of the end surface 23. Therefore, on the fastening surface 43, two female fastener members 41 are positioned at an equal distance from the female guide member 42 on the center line.

The support ring 40 is provided with a flanged rotary gear section (not shown) on the outer periphery of a surface (outer surface 44) which is on an opposite side of the fastening surface 43. The rotary gear section will be described along with the precision rails.

The mandrel 11 is constructed and retained in such a manner that the segments 20, 30 are fastened to the support ring 40 having the above configuration, and has a structure in which the first segment 20 and the second segment 30 are arranged alternately as shown in FIG. 4B.

In the present embodiment, the relation between the order in which the segments 20, 30 fastened are disassembled and detached, and the positions of the segments 20, 30 retained as the mandrel 11 is important. Therefore, the segments 20, 30 constituting the mandrel 11 are assumed as a part (section) of the mandrel 11 and are identified by ordinal numbers. As shown in FIG. 4B, on the basis of the first segment 20a located at the uppermost side, the ordinal numbers are assigned to the segments 20, 30, in a clockwise direction (rightward), and are identified as "location numbers" indicating the positions of the segments 20, 30 when they are assembled as the mandrel 11.

Specifically, as shown in FIG. 4B, the first segment 20a at the uppermost side is "segment of #1," the second segment 30a is "segment of #2," the first segment 20b is "segment of #3," the second segment 30b is "segment of #4," the first segment 20c is "segment of #5," and the second segment 30c is "segment of #6."

[Configuration of Precision Rail]

Figure 5:
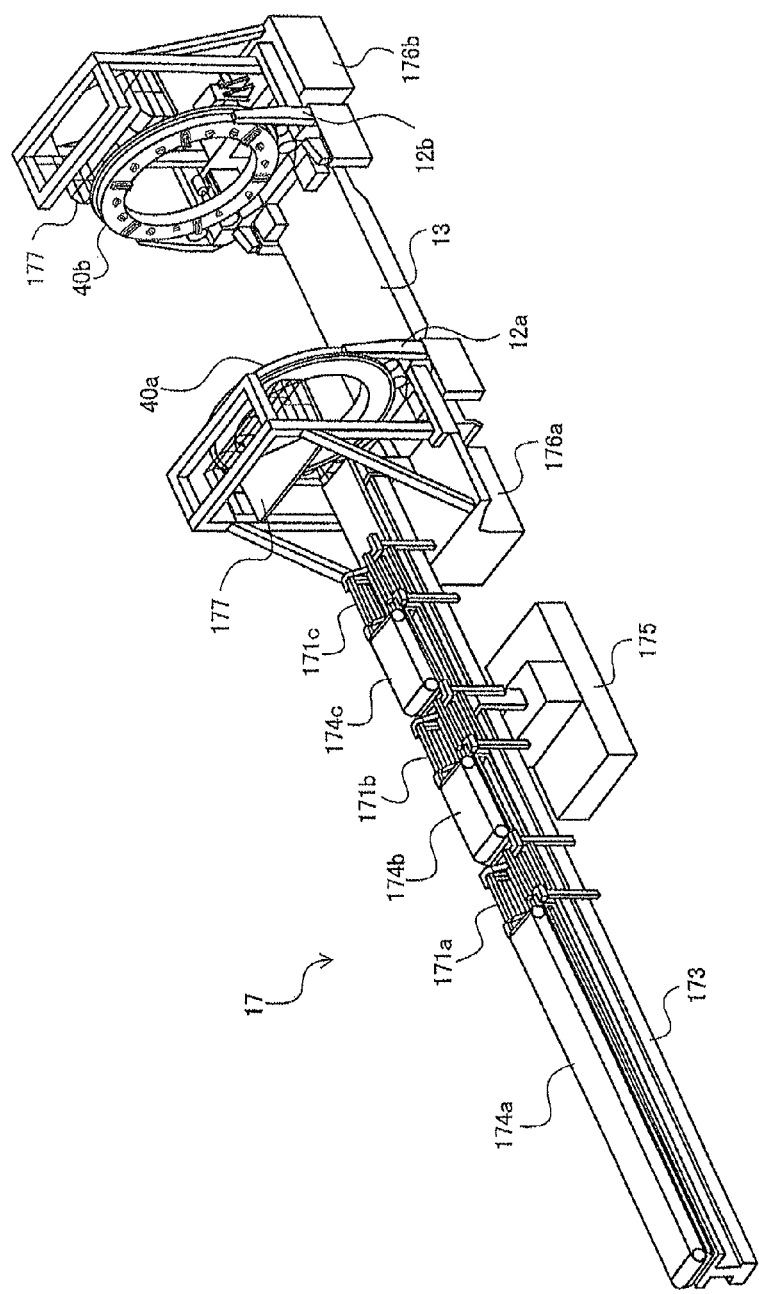
FIG. 5 is a perspective view showing the overall configuration a precision rail which is an example of an assembling/disassembling apparatus for assembling the mandrel of FIG. 1.
Figure 6A:
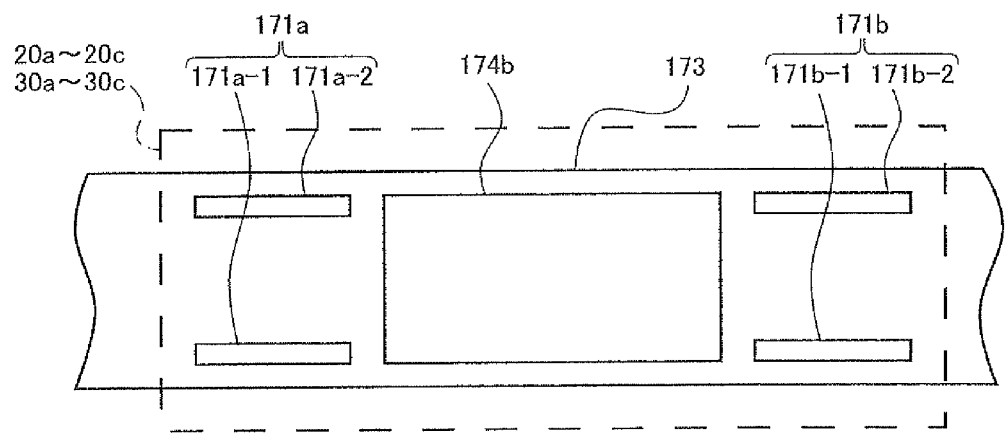
FIG. 6A is a schematic plan view showing a state in which the segment is placed on the precision rail of FIG. 5.
Figure 6B:
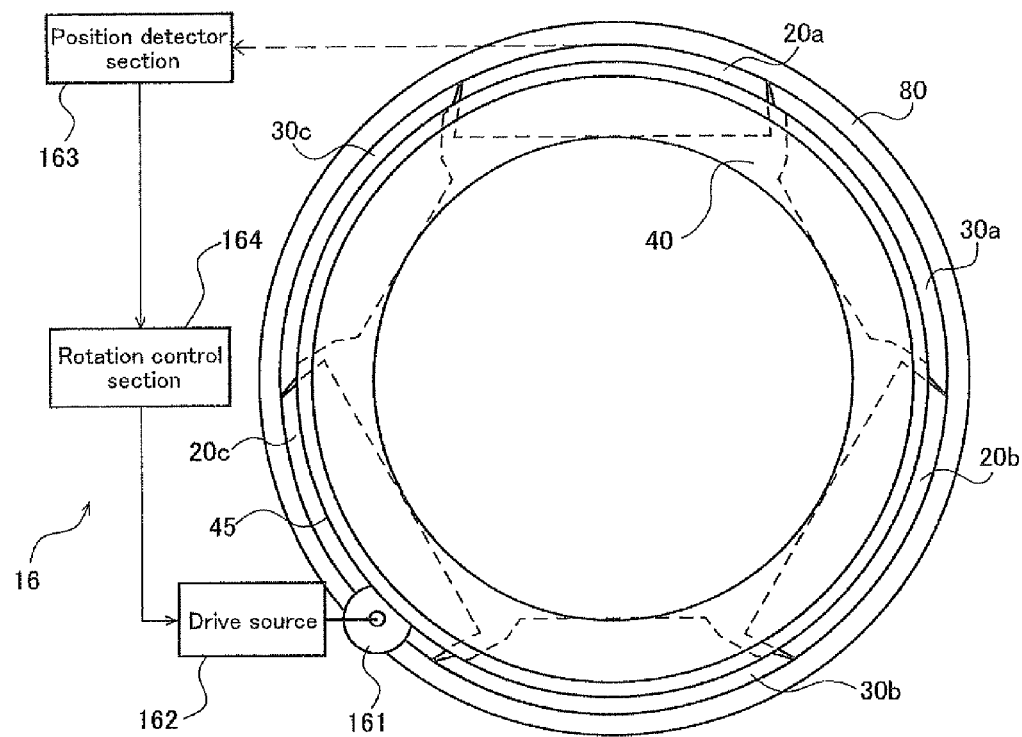
FIG. 6B is a block diagram showing a schematic configuration of a ring rotation drive section included in the precision rail of FIG. 5.

Next, a description will be given of a specific configuration of the precision rail, which is the assembling apparatus for assembling the segments 20, 30 into the cylindrical mandrel 11 and is a disassembling apparatus for disassembling the mandrel 11 into the segments 20, 30, with reference to FIG. 5, and FIGS. 6A and 6B. FIG. 5 is a perspective view showing an example of the overall configuration of the precision rail. FIG. 6A is a schematic plan view showing a state in which the segment is placed on the precision rail of FIG. 5, and FIG. 6B is a block diagram showing a schematic configuration of the ring rotation drive section included in the precision rail of FIG. 5.

As shown in FIG. 5, the precision rail 17 for use in the present embodiment includes a rail body 173, a rail movement support table 175, and a pair of rail support work tables 176a, 176b. The rail body 173 is a single rail member supported on the rail movement support table 175 such that the rail body 173 is movable along its lengthwise direction. On the upper surface of the rail body 173, jack sections 171a, 171b, and 171c, and conveyor sections 174a, 174b, and 174c are provided.

The rail movement support table 175 and the rail support work table 176a support the rail body 173 such that the rail body 173 is movable. In the present embodiment, a clip or scissor-shaped movement support mechanism is provided on a base to support the rail body 173 such that the rail body 173 is movable, although not shown. The movement support mechanism is opened rightward and leftward when the rail body 173 moves. During a stopped state of the rail body 173, the movement support mechanism is closed to sandwich the rail body 173.

The rail support work tables 176a, 176b are positioned to face each other such that the carriage 13 is interposed between them. On the rail support work tables 176a, 176b, upside work tables 177 are provided, respectively. For easier explanation, although not shown, winding steps are provided from a floor surface to the upside work tables 177. Although not shown clearly, under the rail support work table 176a, a movement support mechanism is provided like the rail movement support table 175, and a ring rotation drive section for rotating the support ring 40a is provided. In addition, although not shown clearly, under the rail support work table 176b, a stop support mechanism is provided to support the rail body 173 such that the rail body 173 does not move beyond the location of the rail support work table 176b, and a ring rotation drive section for rotating the support ring 40b is provided.

The support rings 40a, 40b are supported by the cradles 12a, 12b, respectively and by the rail support work tables 176a, 176b, respectively. To be specific, the cradle 12a (12b) supports the support ring 40a (40b) from below by arms sections 121 at least two locations sandwiching a vertical line passing through a center axis of the support ring 40a (40b) and is applied with a rotational force from the ring rotation drive section via the support rollers 123 (see FIG. 1). The rail support work tables 176a, 176b restrict axial movement of the support rings 40a, 40b, on the upper portions of the support rings 40a, 40b (see FIG. 5). In this way, since the support rings 40a, 40b are supported at the upper portion and the lower portion, the support rings 40a, 40b can be rotated while preventing them from falling.

The support rings 40a, 40b are placed on the carriage 13 disposed between the rail support work tables 176a, 176b, via the cradles 12a, 12b. The support ring 40a is supported by the rail support work table 176a and the carriage 13. In this state, the upside work table 177 is positioned to face an upward direction of the support ring 40a. In the same manner, the support ring 40b is supported by the rail support work table 176b and the carriage 13. In this state, the upside work table 177 is positioned to face an upward direction of the support ring 40b.

As shown in FIG. 1, the first segments 20a to 20c and the second segments 30a to 30c constituting the mandrel 11 are fastened to the support rings 40a, 40b. The rail body 173 is movable along its lengthwise direction such that it is inserted into inside of the mandrel 11 (or hollow space of the support rings 40a, 40b) or drawn out of the inside (hollow space). Therefore, as shown in FIG. 5, in a state where the rail body 173 is drawn out of the inside, the rail body 173 and the support rings 40a, 40b are arranged in one line such that its tip end faces the hollow space of the support ring 40a.

In description below, the movement of the rail body 173 is defined as follows. When the rail body 173 is inserted into the hollow space of the support rings 40a, 40b or the inside of the mandrel 11, this movement is referred to as "forward movement," while when the rail body 173 is drawn out of the hollow space of the support rings 40a, 40b or the inside of the mandrel 11, this movement is referred to as "backward movement."

As shown in FIG. 5, the three jack sections 171a to 171c and the three conveyor sections 174a to 174c provided on the upper surface of the rail body 173 are arranged in such a way that the conveyor section 174a, the jack section 171a, the conveyor section 174b, the jack section 171b, the conveyor section 174c, and the jack section 171c are aligned from a rear end side of the rail body 173. The specific configuration of the jack sections 171a to 171c and the conveyor sections 174a to 174c is not particularly limited, but a known configuration can be suitably used.

In the present embodiment, the jack sections 171a to 171c have a substantially equal dimension and substantially the same configuration. The jack sections 171a to 171c are each configured to move in an upward direction an object placed thereon. Among the conveyor sections 174a to 174c, the conveyor section 174a at the rearmost side has a greater length in a conveying direction than the conveyor sections 174b, 174c.

As described later, the conveyor section 174a is configured to convey each of the first segments 20a to 20c or each of the second segments 30a to 30c placed thereon, toward the tip end. Therefore, the length of the conveyor section 174a in the conveying direction is set greater than a lengthwise dimension of each of the first segments 20a to 20c or each of the second segments 30a to 30c. The conveyor section 174b is positioned between the jack sections 171a, 171b, while the conveyor section 174c is positioned between the jack sections 171b, 171c. The conveyor sections 174b, 174c precisely adjust the position of each of the first segments 20a to 20c or each of the second segments 30a to 30c moved onto two of the jack sections 171a to 171c.

Among the three the jack sections 171a to 171c, the jack sections 171a, 171b are used to primarily lift up each of the first segments 20a to 20c or each of the second segments 30a to 30c up to a location above the support rings 40a, 40b. In description of the jack sections 171a, 171b, the first segments 20a to 20c or the second segments 30a to 30c are referred to as the first segment 20 or the second segment 30, respectively.

To be specific, the first segment 20 or the second segment 30 placed on the rail body 173 is moved horizontally toward the tip end by the conveyor section 174a at the rearmost side, to a location covering the upper surfaces of the jack section 171a, the conveyor section 174b, and the jack section 171b, as shown in FIG. 6A. Each of the jack sections 171a to 171c includes a pair of support rod members to support the segment 20 (30). In an example shown in FIG. 6A, the jack section 171a includes support rod members 171a-1, 171a-2, while the jack section 171b includes support rod members 171b-1, 171b-2. The support rod members are provided on the upper surface of the rail body 173 such that they are parallel to the lengthwise direction of the rail body 173 and face to sandwich a center portion in a cross-sectional direction of the rail body 173.

In this state, on the lower surface of the first segment 20 or the second segment 30 having a substantially rectangular shape, the support rod members 171a-1, 171a-2, and the support rod members 171b-1, 171b-2 are placed in locations which are in the vicinity of the four corners of the lower surface of the first segment 20 or the second segment 30, and the conveyor section 174b is disposed between the support rod members 171a-1, 171a-2, and the support rod members 171b-1, 171b-2. Therefore, the jack sections 171a, 171b can lift up the first segment 20 or the second segment 30 while changing the positions of the four corners. This allows the first segment 20 or the second segment 30 fastened to the support rings 40a, 40b to be easily detached therefrom, as described later.

The support rings 40a, 40b to which the first segment 20 or the second segment 30 is fastened are rotatable. As a configuration for rotating the support rings 40a, 40b, as described later, the ring rotation drive section is provided below the rail support work tables 176a, 176b. In description of the ring rotation drive section, below, the support rings 40a, 40b are referred to as the support ring 40.

As shown in FIG. 6B, a ring rotation drive section 16 includes a drive gear 161 in mesh with a rotary gear section 45 provided on the outer periphery of the support ring 40, a drive source 162 which includes a motor, a gear, etc., and rotates the drive gear 161, a position detector section 163 which detects whether or not the segment 20 or the segment 30 which is the detached target is positioned at the uppermost portion of the support ring 40, and a rotation control section 164 for controlling these constituents. As the position detector section 163, a known sensor is used. As the rotation control section 164, a processor such as a CPU is used.

A specific configuration for detecting the position by the position detector section 163 is not particularly limited. In the present embodiment, the position detector section 163 detects a detected portion (not shown) provided on the support ring 40. In the configuration shown in FIG. 6B, the position detector section 163 detects that the segment 20 or the segment 30 which is the detached target is positioned at the uppermost portion of the support ring 40, and therefore the detected portion is provided on the segment 20 or the segment 30. The specific configuration of the position detector section 163 is not limited, so long as the position detector section 163 is capable of detecting that the detected portion has reached a predetermined detection position by the rotation of the support ring 40. For example, the detected portion may be positioned below the support ring 40, when the segment 20 or the segment 30 which is the detached target is positioned at the uppermost portion of the support ring 40. This allows the ring rotation drive section 16 to be configured compactly. The detected portion may be an optical, mechanical, or physical configuration.

The ring rotation drive section 16 causes the support ring 40 to rotate, thereby allowing the segment 20 (30) to be disassembled with the same motion, rather than with different motions.

[Configuration of Outer Ring]

Figure 7A:
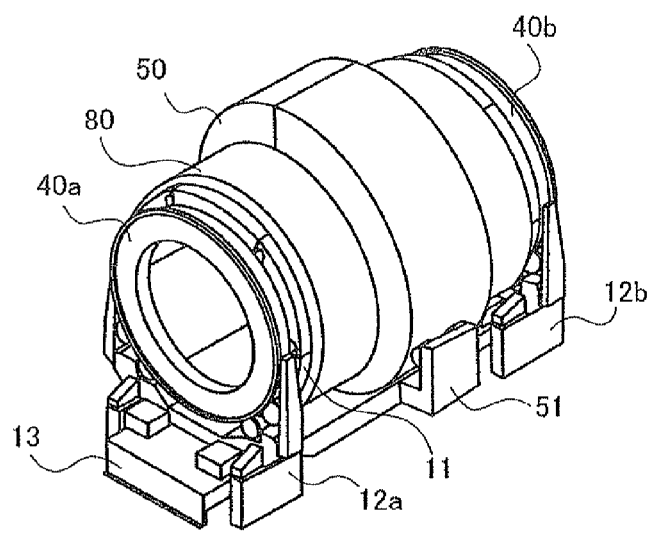
FIG. 7A is a perspective view schematically showing a state in which an outer ring used in the present embodiment is mounted to the outer periphery of a molded product.
Figure 7B:
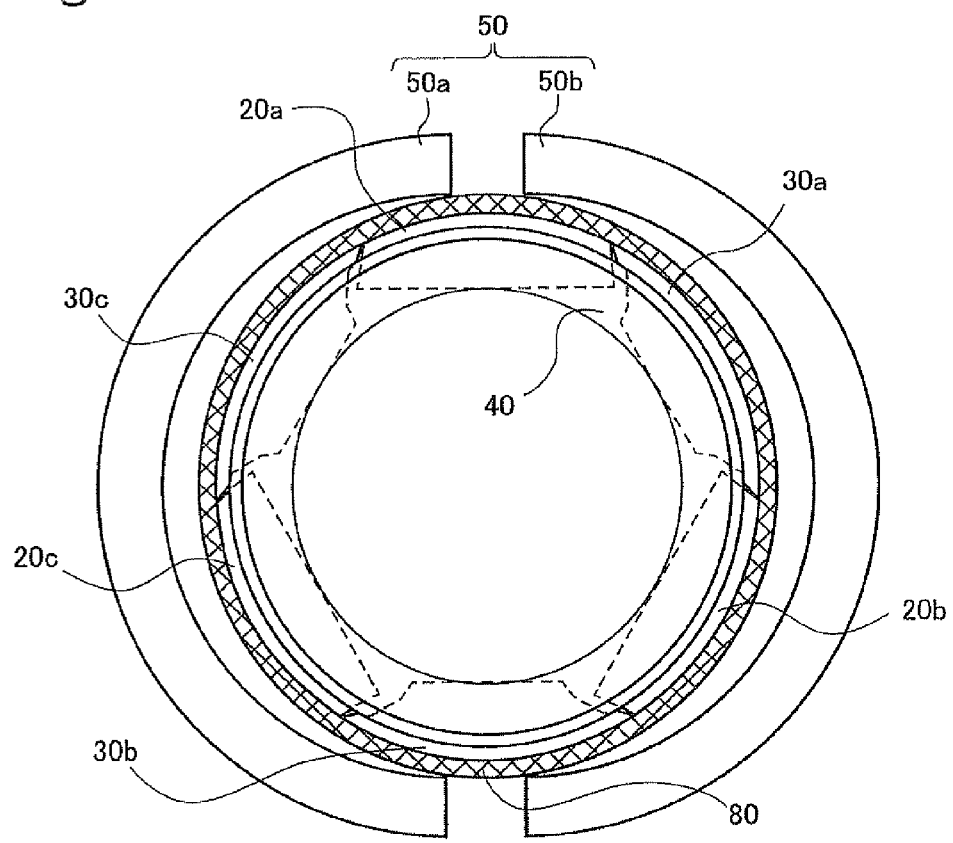
FIG. 7B is a plan view schematically showing a state in which the outer ring of FIG. 7A is mounted to the molded product.

Next, a description will be given of the configuration of an outer ring supporting from outside the molded product 80 retained on the outer periphery of the mandrel 11 in the process for disassembling the mandrel 11 including the six segments 20, 30, using the above stated precision rail 17, with reference to FIGS. 7A and 7B. FIG. 7A is a perspective view schematically showing a state in which an outer ring 50 used in the present embodiment is mounted to the outer periphery of the molded product 80, and FIG. 7B is a plan view schematically showing a state in which the outer ring 50 of FIG. 7A is mounted to the molded product 80.

As shown in FIG. 7A, the outer ring 50 is provided to support from outside the center portion of the molded product 80 located on the outer periphery of the mandrel 11. As shown in FIG. 7B, the outer ring 50 is separable into ring portions 50a and 50b at two locations which are a lower location in the vertical direction (location in the 6 o'clock direction) and an upper location in the vertical direction (location in the 12 o'clock direction). The ring portions 50a, 50b are mounted to the outer periphery of the molded product 80 such that the ring portions 50a, 50b enclose the molded product 80 hatched by lattice lines in FIG. 7B, from the outer periphery, and fastened to portions at the location in the 6 o'clock direction and at the location in the 12 o'clock direction, thereby forming the outer ring 50 as a single annular support member.

The molded product 80 is provided with an actuator and a buffer member which are not shown, on the inner peripheral side of the outer ring 50. The buffer member is not particularly limited, but may be a structure in which a steel-made plate-shaped member is attached with a sponge-shaped cushion member at an end portion thereof. The actuator may be an air cylinder. When the ring portions 50a, 50b are mounted to the molded product 80 such that the ring portions 50a, 50b enclose the molded product 80, the actuator causes the buffer member to move to an advanced position toward the molded product 80 while checking the position by using a position sensor, and is brought into contact with the outer peripheral surface of the molded product 80.

Thus, the outer ring 50 supports the outer peripheral surface of the molded product 80 gently and surely. Therefore, the molded product 80 can be retained surely by the outer ring 50 from outside, without deforming the molded product 80 made of fiber-reinforced resin composite material.

After the outer ring 50 is mounted to the molded product 80, the mandrel 11 attached to the inside of the molded product 80 is disassembled into the first segments 20a to 20c and the second segments 30a to 30c and detached, as described later. At this time, by rotating the support rings 40a, 40b supporting the mandrel 11, the mandrel 11 rotates. The outer ring 50 is configured to rotate by an outer ring rotation section 51 of FIG. 7A, in synchronization with the rotation of the support rings 40a, 40b. This allows the outer ring 50 to retain the molded product 80 appropriately from outside when the mandrel 11 is detached.

In a state in which detaching of the mandrel 11 is completed, the support rings 40a, 40b are detached, and a pair of end rings supporting the both ends of the molded product 80 are mounted. At this time, the outer ring 50 continues to retain the molded product 80. In this way, in a state in which the mandrel 11 is not positioned inside of the molded product 80, the both ends of the molded product 80 are supported by the end rings and the center portion of the molded product 80 is supported by the outer ring 50 from outside. Therefore, the present manufacturing step shifts to a next manufacturing step while maintaining the shape of the cylindrical molded product 80.

[Disassembling Method of Mandrel, Overall Configuration]

Figure 8:
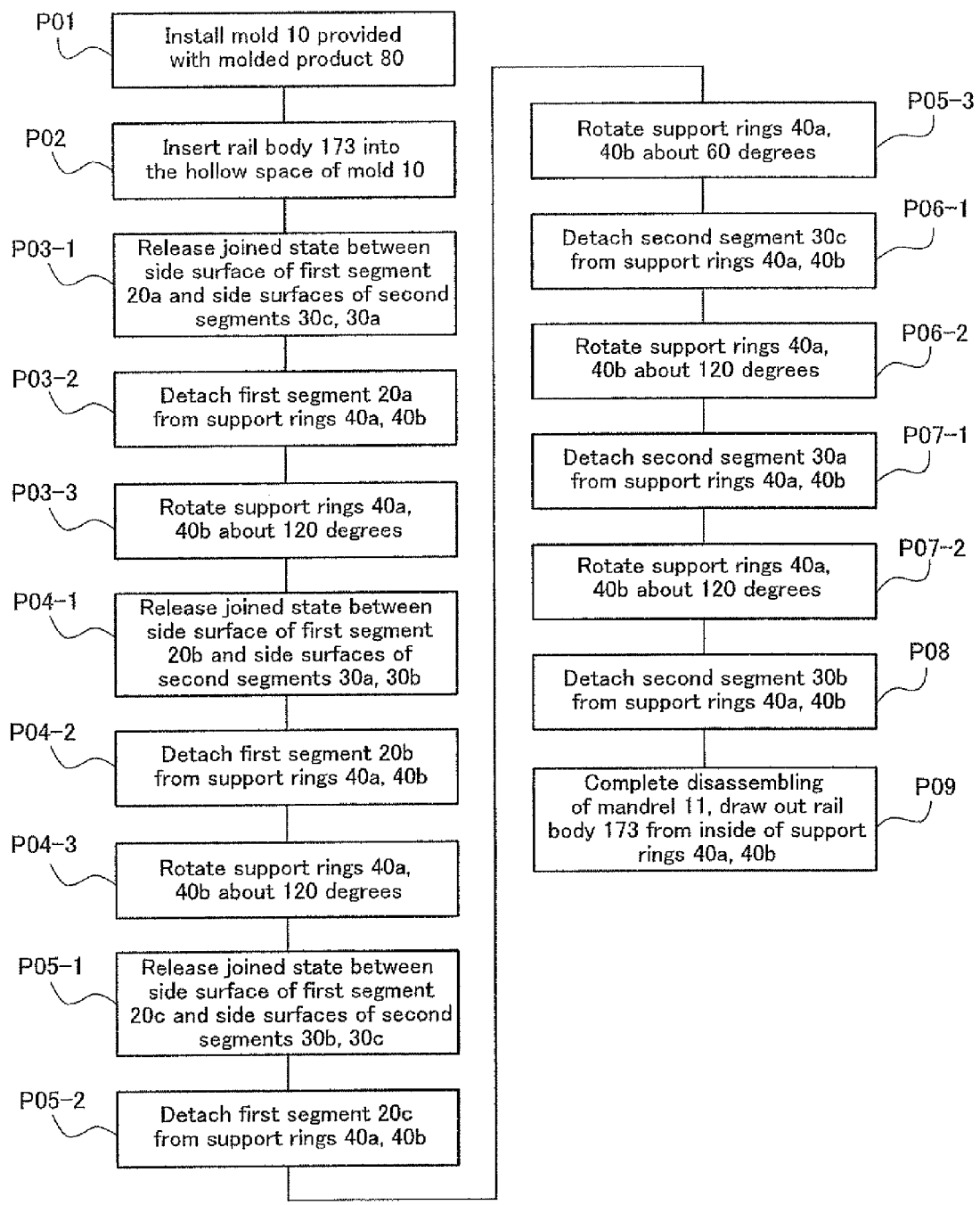
FIG. 8 is a view of steps showing the overall configuration of a disassembling method of the present embodiment, for disassembling the mandrel of FIG. 1.

Next, a description will be specifically given of the method of disassembling the mandrel 11 composed of the six segments 20, 30, one by one, by using the precision rail 17. Firstly, the overall disassembling method of the mandrel 11 will be described with reference to FIG. 8. FIG. 8 is a view of steps showing the overall configuration of the disassembling method of the present embodiment, for disassembling the mandrel 11.

Although not described in detail in the present embodiment, at a time when the molded product 80 is molded on the outer periphery of the mandrel 11 included in the mold 10 and a predetermined process step such as trimming is performed, the mandrel 11 which is the molding core must be detached from the molded product 80. Accordingly, as shown in FIG. 8, in the present embodiment, initially, the mold 10 in a state in which the molded product 80 is molded and the predetermined process step is completed is placed between the rail support work tables 176a, 176b of the precision rail 17 (step P01). At this time, the support rings 40a, 40b may be rotated to move the first segment 20a up to the uppermost portion, if the first segment 20a to be detached firstly is not positioned at the uppermost portion.

Then, the rail body 173 is inserted into the hollow space of the mold 10 (step P02). Thereby, the rail body 173 is positioned inside of the support rings 40a, 40b and the mandrel 11. In this state, the mandrel 11 can be disassembled. Note that in this state, the above stated outer ring 50 has been already mounted to the outer periphery of the center portion of the molded product 80.

Then, the first segments 20a to 20c are detached one by one in the order of segment 20a, 20b and 20c (step P03-1~P05-3). Then, the second segments 30a to 30c are detached one by one in the order of segment 30c, 30a and 30b (step P06-1~P08).

When all of the segments have been detached from the support rings 40a, 40b, disassembling of the mandrel 11 is completed. After that, the rail body 173 is drawn out of the inside of the support rings 40a, 40b (step P09), thereby completing a series of disassembling steps.

Among the above stated steps, steps P03-2, P04-2, P05-2, P06-1, P07-1 and P08 will be referred to as a segment detaching step, while steps P03-3, P04-3, P05-3, P06-2, and P07-2 will be referred to as a rotation step. Also, steps P03-1, P04-1, and P05-1 will be referred to as a segment separating step, a step P01 will be referred to as a mold installation step, step P02 will be referred to as a rail insertion step, and a step P09 will be referred to as a rail draw-out step. The segment detaching step is divided into first segment detaching steps P03-2, P04-2, and P05-2, and second segment detaching steps P06-1, P07-1, and P08.

The disassembling method of the present embodiment is such that the first segments 20a to 20c are detached one by one from between adjacent ones of the second segments 30a to 30c, and then the second segments 30a to 30c are detached one by one. Next, a detaching method and a detaching work of the first segments 20a to 20c will be described with reference to FIGS. 9 to 17. In description below, the outer ring 50 is omitted from the drawings, when description will be given of how the first segments 20a to 20c and the second segments 30a to 30c are detached.

[Disassembling Method of Mandrel, Detaching of First Segments]

Initially, the operation for detaching the first segments 20a to 20c from between adjacent ones of the second segments 30a to 30c, occurs. The order of the detaching method and detaching work of the first segments 20a to 20c will be described with reference to FIGS. 9 to 17, along with the specific configuration of the segment joining/retaining mechanism and the segment joining/guide mechanism. The detaching of the first segments 20 will be described hereinafter, by using the location numbers assigned to the segments 20, 30 as shown in FIG. 4B.

Figure 9:
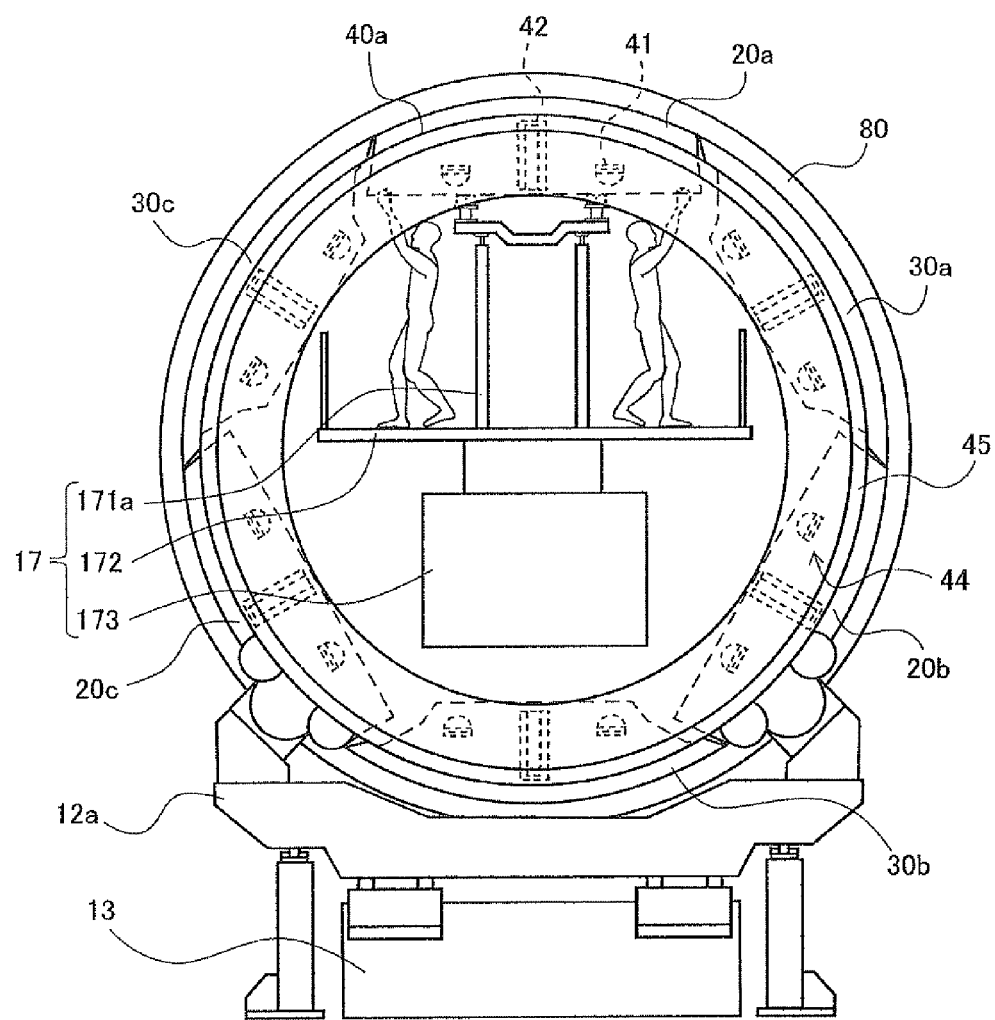
FIG. 9 is a schematic view showing a state in which a jack section is moved up and placed at a reverse side of a first segment of #1 of FIG. 4B, to detach the first segment of #1 from a second segment of #6 adjacent to the first segment of #1, a second segment of #2 adjacent to the first segment of #1, and the support rings.
Figure 11A:
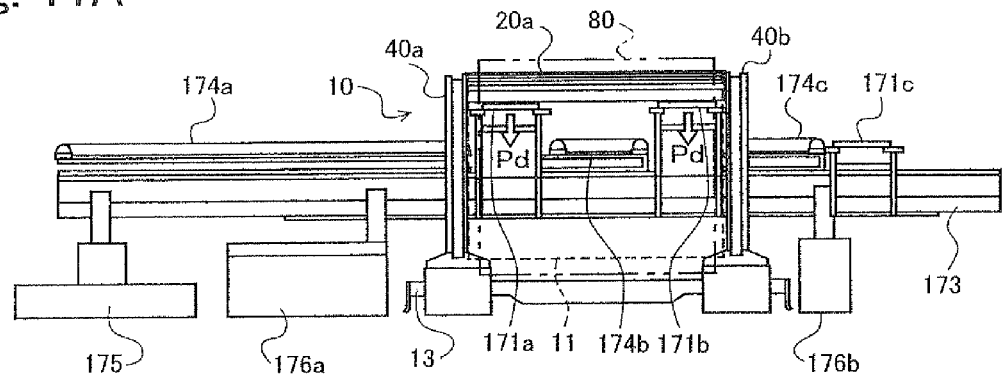
FIGS. 11A to 11C are side views of the precision rail showing the operation of the precision rail, which follows the operation of FIG. 10B.
Figure 11B:
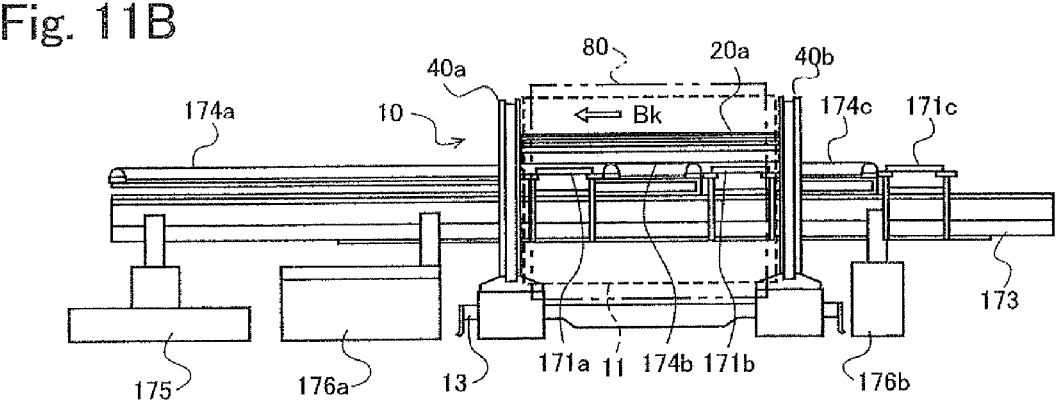
Figure 11C:
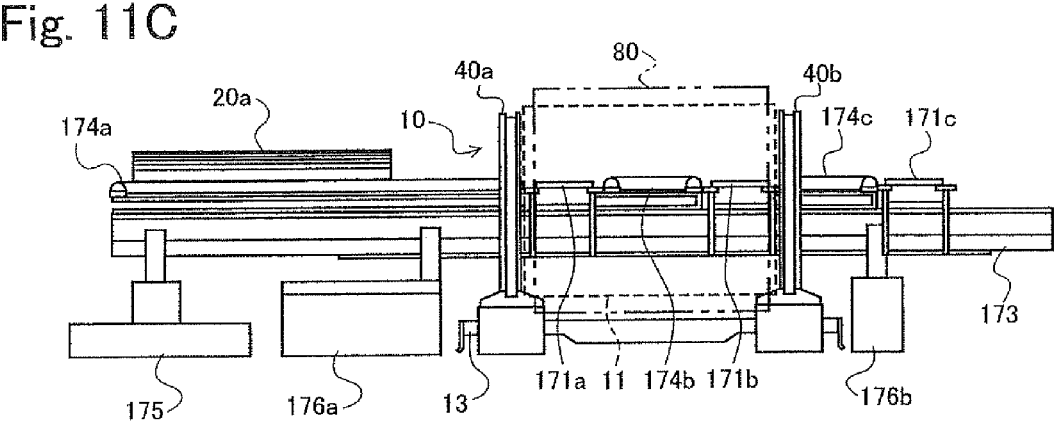

FIG. 9 is a schematic view showing a state in which the jack section 171a (and jack section 171b) is moved up and placed at a reverse side of a first segment 20a of #1, to detach the first segment 20a from a second segment 30c of #6 adjacent to the first segment 20a, a second segment 30a of #2 adjacent to the first segment 20a, and the support rings 40a, 40b. FIGS. 10A and 10B are side views of the precision rail 17 showing the operation of the precision rail 17, which is performed when the first segment 20a is detached. FIGS. 11A to 11C are side views of the precision rail 17 showing the operation of the precision rail 17, which follows the operation of FIG. 10B.

Figure 12A:
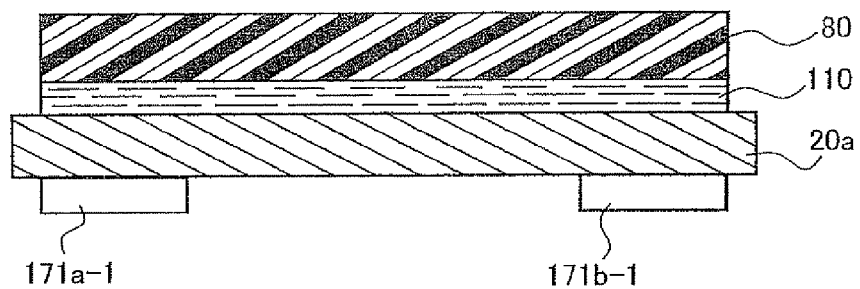
FIGS. 12A and 12B are schematic cross-sectional views showing a state in which support rod members of the jack section support the first segment in the operation of the precision rail of FIGS. 11A and 11B.
Figure 12B:
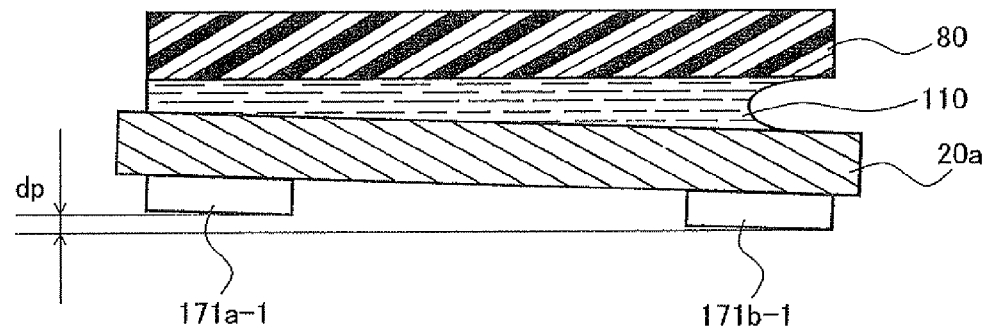
Figure 12C:
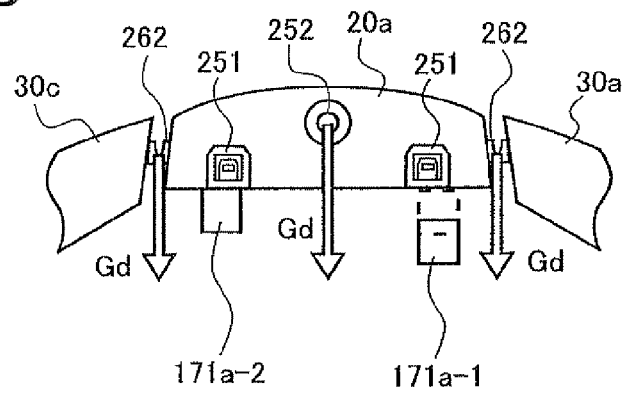
FIG. 12C is a schematic front view showing a state in which the support rod members of the jack section support the first segment in the operation of the precision rail of FIGS. 11A and 11B.

FIGS. 12A and 12B are schematic cross-sectional views showing a state in which support rod members 171a-1 and 171b-1 of the jack sections 171a, 171b support the first segment 20a in the operation of the precision rail 17 of FIGS. 11A and 11B, and FIG. 12C is a schematic front view showing a state in which the support rod members 171a-1, 171a-2 of the jack section 171a support the first segment 20a in the operation of the precision rail 17 of FIGS. 11A and 11B.

Figure 13:
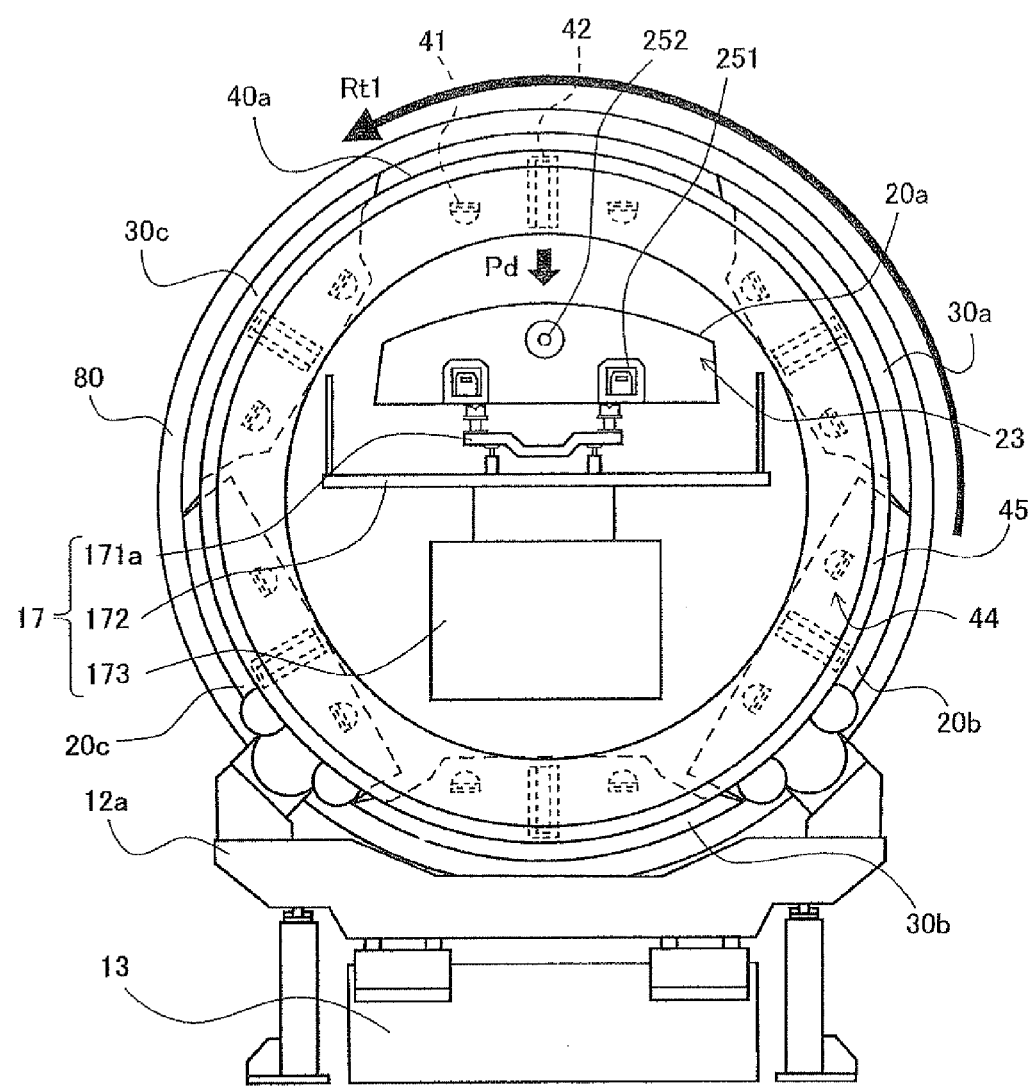
FIG. 13 is a schematic view showing a state in which the first segment of #1 of FIG. 4B is detached and the jack section is moved downward.

FIG. 13 is a schematic view showing a state in which the first segment 20a of #1 is detached and the jack section 171a (and jack section 171b) is moved downward. FIGS. 14 to 17 are schematic views showing a state in which the jack section 171a is moved up or moved downward when the first segment 20b of #3 or the first segment 20c of #5 is detached from adjacent ones of the second segments 30a to 30c and the support rings 40a, 40b.

In the schematic views showing the state in which the segments 20, 30 are detached, including FIG. 9, a part of the cradle 12a and the carriage 13 are omitted to clearly show the locations in which the segments 20, 30 are fastened onto the support ring 40a. Although the both ends of the segments 20, 30 are fastened to the support rings 40a, 40b, only the support ring 40a (and the cradle 12a supporting the support ring 40a) are shown in the schematic views, to provide easier explanation. Therefore, of course, the support ring 40b is supported by the cradle 12b, and the segments 20, 30 are fastened to the support ring 40b, as in the case of the support ring 40a.

As shown in FIG. 9, the cradle 12a mounted to the carriage 13 supports the support ring 40a and the support ring 40b which is not shown, such that the support rings 40a, 40b stand vertically, and the mandrel 11 is retained between the support rings 40a, 40b (step P01 shown in FIG. 8, mold installation step). Then, the precision rail 17 is placed in a location in the hollow space of the mandrel 11 and the support rings 40a, 40b and between the support rings 40a, 40b facing each other.

The operation of the precision rail 17 which is moved to the position of FIG. 9 will be described. As shown in FIG. 10A, the rail body 173 of the precision rail 17 is not inserted into the hollow space of the support rings 40a, 40b, but is supported on the rail movement support table 175 and the rail support work table 176a in a state where the rail body 173 is completely drawn out of the support rings 40a, 40b. In FIGS. 10A to 11C, the mold 10 is composed of the mandrel 11 and the support rings 40a, 40b indicated by broken lines and the molded product 80 indicated by two-dotted lines.

At this time, the rail body 173 is in a completely retracted position. From this position, the rail body 173 moves forward toward the mold 10 as indicated by an arrow Is in FIG. 10 (step P02 of FIG. 8, rail insertion step).

Then, as shown in FIG. 10B, the rail body 173 is inserted into the hollow space of the mold 10, moves forward to the terminal end thereof, stops there, and is supported on the rail movement support table 175, and the rail support work tables 176a, 176b. In this state, the jack section 171a, the conveyor section 174b and the jack section 171b are positioned below the first segment 20a positioned at the uppermost portion of the support rings 40a, 40b. Then, the jack section 171a and the jack section 171b are moved up as indicated by an arrow Lf.

Then, as shown in FIG. 11A, the jack sections 171a, 171b stop in contact with the reverse side of the first segment 20a. The state shown in FIG. 11A corresponds to the state shown in FIG. 9.

Next, the specific operation for detaching the first segment 20a will be described. As shown in FIG. 2A, on each of the side surfaces 22 of the first segment 20a, there are provided male joining members 261 and joining wedge members (not shown) as the segment joining/retaining mechanism, and an outer peripheral female guide member 262 and an inner peripheral male guide member (not shown) as the segment joining/guide mechanism. On each of the side surfaces 32 of each of the second segments 30a to 30c, there are provided female joining members as a segment joining/retaining mechanism, and an outer peripheral male guide member and an inner peripheral female guide member as a segment joining/guide mechanism for guiding the segment joining/retaining mechanism to a proper position. Moreover, in the present embodiment, as the segment joining/retaining mechanism, clamp members are provided.

Initially, the state in which the first segment 20a and the second segments 30c, 30a are joined together by the segment joining/retaining mechanism are separated from each other (step P03-1 in FIG. 8, segment separating step). Specifically, in the present embodiment, the segment joining/retaining mechanism includes the clamp member as well as the male joining member 261 and the female joining member. As shown in FIG. 9, for example, operators are placed on the internal work table 172, manually detach the clamp members, and then release the state in which the male joining members 261 and the female joining members are fitted together by the joining wedge members. The same work is performed for all of the segment joining/retaining mechanisms, and thus, the segment separating step is completed. The operation for separating the segments joined together by the segment joining/retaining mechanism will be referred to as "segment separating operation."

In this state, the first segment 20a is fastened to the support rings 40a, 40b at the end surfaces 23 thereof. On the end surface 23 (see FIGS. 2A and 2B) of the first segment 20a, the male fastener members 251 and the male guide member 252 are provided, while on the fastening surface 43 of the support ring 40a (see FIG. 4A), the female fastener members 41, the female guide member 42, and the fastening wedge members (not shown) are provided. The male guide member 352 and the female guide member 42 constitute the annular fastening/guide mechanism, while the male fastener members 351, the female fastener members 41 and the fastening wedge members constitute an annular fastening/retaining mechanism.

Then, the fastened state between the first segment 20a and the support rings 40a, 40b by the annular fastening/retaining mechanism is released. To be specific, the fitted state between the male fastener member 251 and the female fastener member 41 by the fastening wedge member is released. The operation for releasing the fastened state by the annular fastening/retaining mechanism is referred to as "segment disengaging operation."

By moving the first segment 20a downward, it is detached from the molded product 80 molded on the obverse surface 21 of the first segment 20a. As shown in FIG. 12A, normally, a layer of a mold release agent 110 is formed between the inner surface of the molded product 80 and the obverse surface 21. Therefore, if an attempt is made to merely move the first segment 20a downward after the segment disengaging operation and the segment separating operation are performed, the first segment 20a cannot be separated smoothly from the molded product 80, because the inner surface of the molded product 80 and the obverse surface 21 of the first segment 20a adhere onto each other, because of the surface tension of mold release agent 110.

However, as described above, the portions of the first segment 20a in the vicinity of the four corners can be moved downward independently respectively, by the support rod members 171a-1, 171a-2, 171b-1, 171b-2. For example, as shown in FIG. 12B, the support rod member 171b-1 is made lower than the support rod member 171a-1 and the first segment 20a is slightly inclined and moved downward such that a level difference dp is generated between the support rod members 171a-1, 171b-1. This makes it possible to introduce air little by little from the end surface 23 side to the layer of the mold release agent 110. As a result, the obverse surface 21 of the first segment 20a can be separated smoothly from the inner surface of the molded product 80.

In a state where the first segment 20a is supported by the jack sections 171a, 171b even after the segment separating operation and the segment disengaging operation are completed, the male and female guide members constituting the segment joining/guide mechanism and the annular fastening/guide mechanism remain fitted together. Therefore, when the jack sections 171a, 171b are moved downward, the first segment 20a being moved downward is guided by the segment joining/guide mechanism and the annular fastening/guide mechanism in a direction in which the first segment 20a will not collide against the adjacent second segments 30c, 30a and the support rings 40a, 40b.

For example, as shown in FIG. 12C, it is supposed that the support rod member 171a-1 of the jack section 171a is made lower than the support rod member 171a-2 of the jack section 171a and the first segment 20a is inclined in its width direction. In this case, the male guide member 252 constituting the annular fastening/guide mechanism guides the end portion of the first segment 20a to cause it to move downward in an arrow Gd direction. Therefore, the first segment 20a is prevented from colliding against the support rings 40a, 40b which is not shown in FIG. 12C. In addition, the outer peripheral female guide member 262 constituting the segment joining/guide mechanism guides the side portions of the first segment 20a to cause them to move downward in the arrow Gd direction. Therefore, the first segment 20a is prevented from colliding against the adjacent second segments 30a, 30a. The downward movement of the first segment 20a is guided occurs in the same manner when the first segment 20a is inclined slightly in its lengthwise direction as shown in FIG. 12B.

When the jack sections 171a, 171b are moved downward after the segment separating operation and the segment disengaging operation are performed, the guide mechanisms guide the first segment 20a to cause it to move downward in a proper direction and is detached from the support rings 40a, 40b as shown in FIG. 11B and FIG. 13 without affecting the components (support rings 40a, 40b, and adjacent second segments 30c, 30a) in the vicinity of the first segment 20a (step P03-2 in FIG. 8, first segment detaching step). The operation for adjusting the positions of the portions in the vicinity of the four corners of the first segment 20a, when the first segment 20a is moved downward is referred to as "four-corner position adjustment operation).

In a state where the jack sections 171a, 171b are in a completely down position, the first segment 20a is placed on the conveyor section 174b positioned between the jack sections 171a, 171b as shown in FIG. 11B. The conveyor section 174b and the conveyor section 174a at the rear end side of the rail body 173 are actuated to move the first segment 20a to the rear end side as indicated by an arrow Bk. Thereby, as shown in FIG. 11C, the first segment 20a is carried out from inside of the hollow space of the mold 10. In this way, the first segment 20a can be detached without affecting the molded product 80.

Then, as indicated by an arrow Rt1 of FIG. 13, the support ring 40a (and support ring 40b not shown) is rotated about 120 degrees by the ring rotation drive section 16 (step P03-3 in FIG. 8, rotation step). Thereby, the first segment 20b of #3 at right and lower side in FIG. 13 moves to the uppermost portion.

Figure 14:
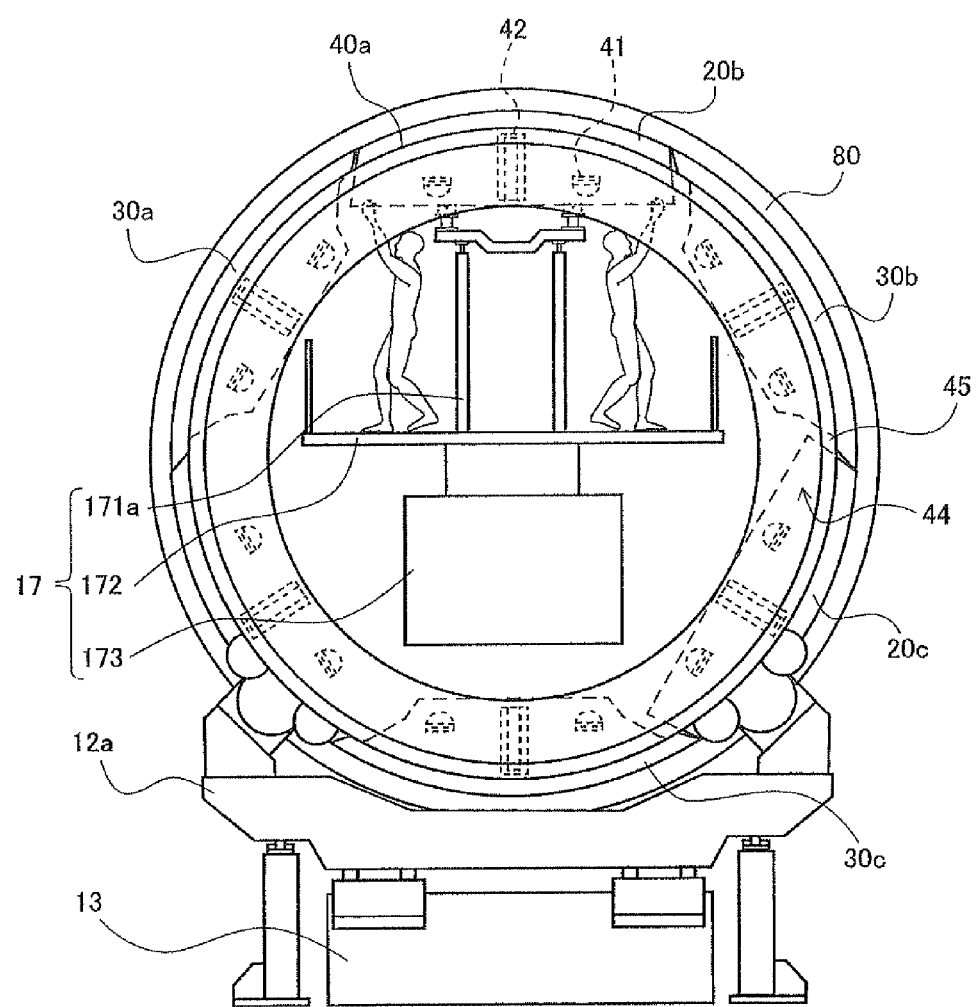
FIG. 14 is a schematic view showing a state in which the jack section is moved up and placed at a reverse side of a first segment of #3 of FIG. 4B, to detach the first segment of #3 from a second segment of #2 adjacent to the first segment of #3, a second segment of #4 adjacent to the first segment of #3, and the support rings.

When the first segment 20b of #3 is positioned at the uppermost portion, the precision rail 17 performs the operation shown in FIG. 10B to FIG. 11A, and the jack sections 171a, 171b move up and contact the reverse side of the first segment 20b as shown in FIG. 14. In this state, the segment separating operation is performed, to release the joined state between the first segment 20b and the second segments 30a, 30b (step P04-1 in FIG. 8, segment separating step).

Figure 15:
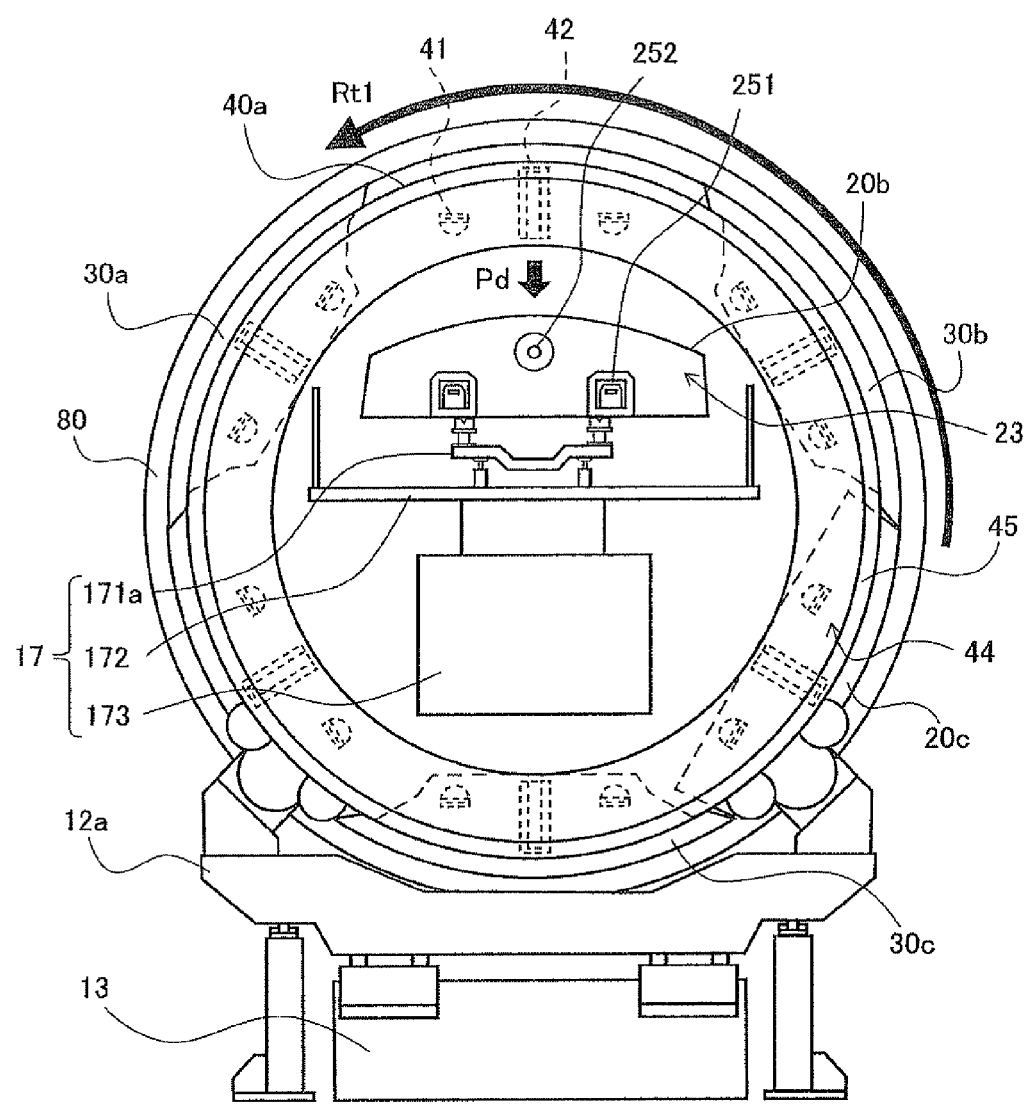
FIG. 15 is a schematic view showing a state in which a second segment of #3 of FIG. 4B is detached and the jack section is moved downward.

Then, the segment disengaging operation is performed. The jack sections 171a, 171b are moved downward as indicated by an arrow Pd in FIG. 11A, and the four-corner position adjustment operation is performed according to the down movement. In this way, as shown in FIG. 15, the first segment 20b is detached smoothly without affecting the molded product 80 and the components in the vicinity of the first segment 20b (step P04-2 in FIG. 8, first segment detaching step). Then, the precision rail 17 performs the operation shown in FIG. 11B and FIG. 11C, and the first segment 20b is carried out from inside of the hollow space of the mold 10.

Then, as indicated by an arrow Rt1 of FIG. 15, the support ring 40a (and support ring 40b not shown) is rotated about 120 degrees by the ring rotation drive section 16 (step P04-3 in FIG. 8, rotation step). Thereby, the first segment 20c of #5 at right and lower side in FIG. 15 moves to the uppermost portion.

Figure 16:
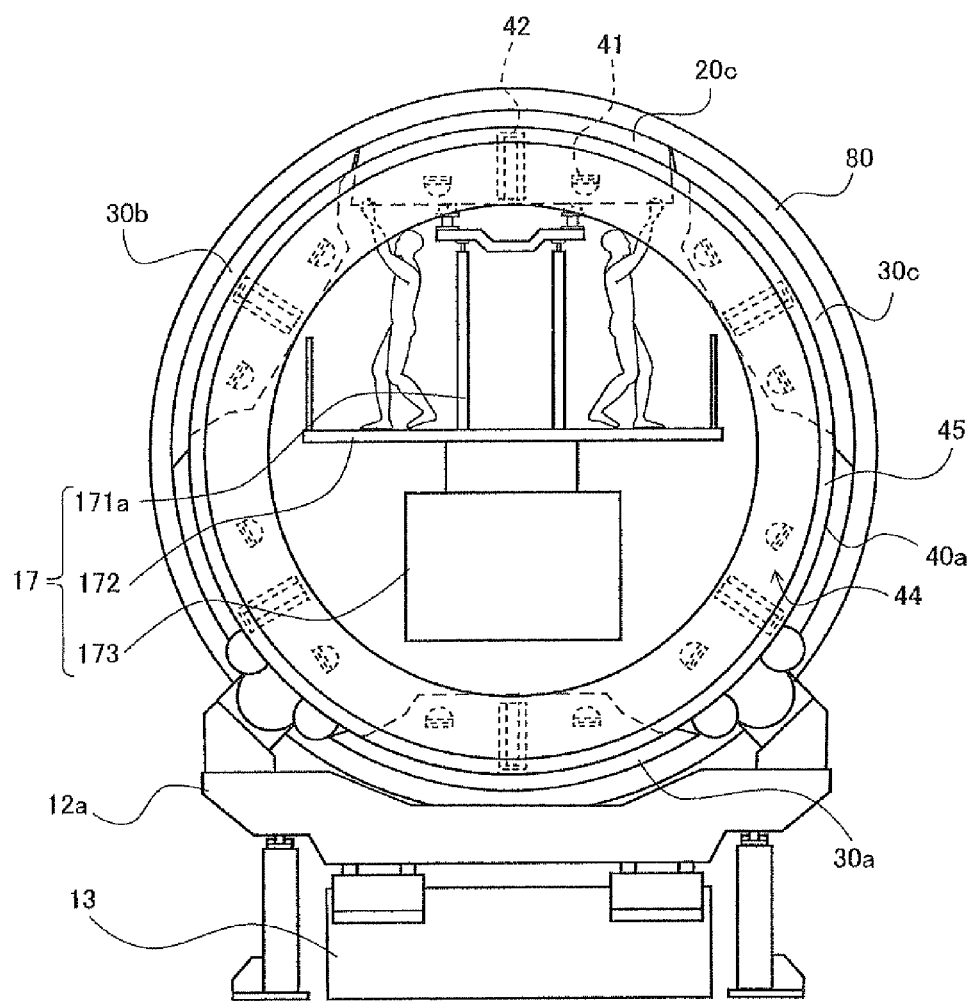
FIG. 16 is a schematic view showing a state in which the jack section is moved up and placed at a reverse side of a first segment of #5 of FIG. 4B, to detach the first segment of #5 from a second segment of #4 adjacent to the first segment of #5, a second segment of #6 adjacent to the first segment of #5, and the support rings.

When the first segment 20c of #5 is positioned at the uppermost portion, the precision rail 17 performs the operation shown in FIG. 10B to FIG. 11A, and the jack sections 171a, 171b move up and contact the reverse side of the first segment 20c as shown in FIG. 16. In this state, the segment separating operation is performed, to release the joined state between the first segment 20c and the second segments 30a, 30b (step P05-1 in FIG. 8, segment separating step).

Figure 17:
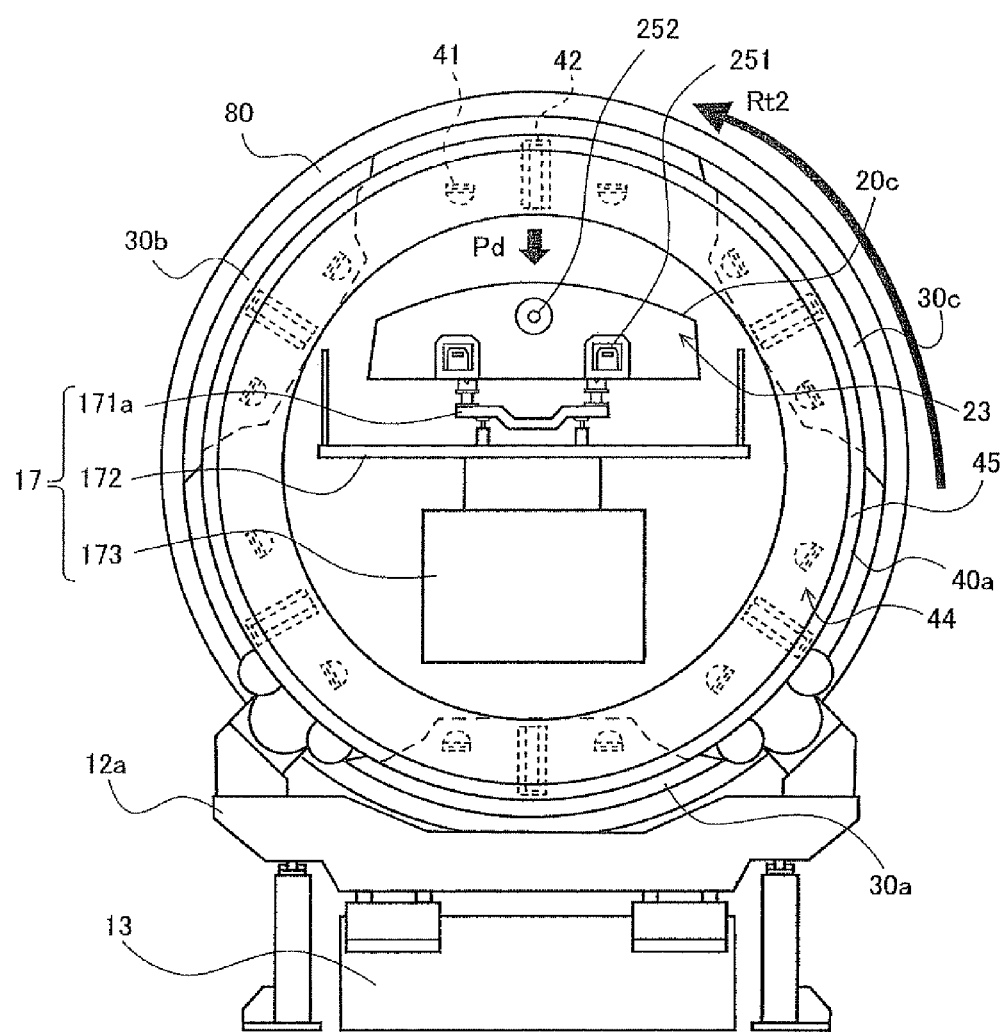
FIG. 17 is a schematic view showing a state in which a first segment of #5 of FIG. 4B is detached and the jack section is moved downward.

Then, the segment disengaging operation is performed. The jack sections 171a, 171b are moved downward as indicated by the arrow Pd in FIG. 11A, and the four-corner position adjustment operation is performed according to the down movement. In this way, as shown in FIG. 17, the first segment 20c is detached smoothly without affecting the molded product 80 and the components in the vicinity of the first segment 20c (step P05-2 in FIG. 8, first segment detaching step). Then, the precision rail 17 performs the operation shown in FIG. 11B and FIG. 11C, and the first segment 20c is carried out from inside of the hollow space of the mold 10.

[Disassembling Method of Mandrel, Detaching of Second Segments]

Next, the operation for detaching the second segments 30a to 30c from the support rings 40a, 40b takes place. The order of the fastening method and fastening work of the first segments 20a to 20c will be described with reference to FIGS. 18 to 23 in addition to FIG. 17. In description below, the fastening of the second segments 30 will be described hereinafter, by using the location numbers assigned to the segments 20, 30 as shown in FIG. 4B.

FIGS. 18 to 23 are schematic views showing a state in which the jack section 171a is moved up or downward when the second segment 30c of #6, the second segment 30b of #2, or the second segment 30c of #4, is detached from the support rings 40a, 40b.

When all of the first segments 20a to 20c have been detached, the support rings 40a, 40b are rotated about 60 degrees by the ring rotation drive section 16 as indicated by the arrow Rt2 of FIG. 17 (step P05-3 in FIG. 8, rotation step). When the first segments 20a to 20c are detached firstly, the support rings 40a, 40b are required to be rotated with a rotational angle of about 120 degrees corresponding to the fastening locations of two segments, because each of the first segments 20a to 20c is fastened to every two locations. However, in this step, since the second segment 30c is detached, the rotational angle is about 60 degrees corresponding to one segment.

Figure 18:
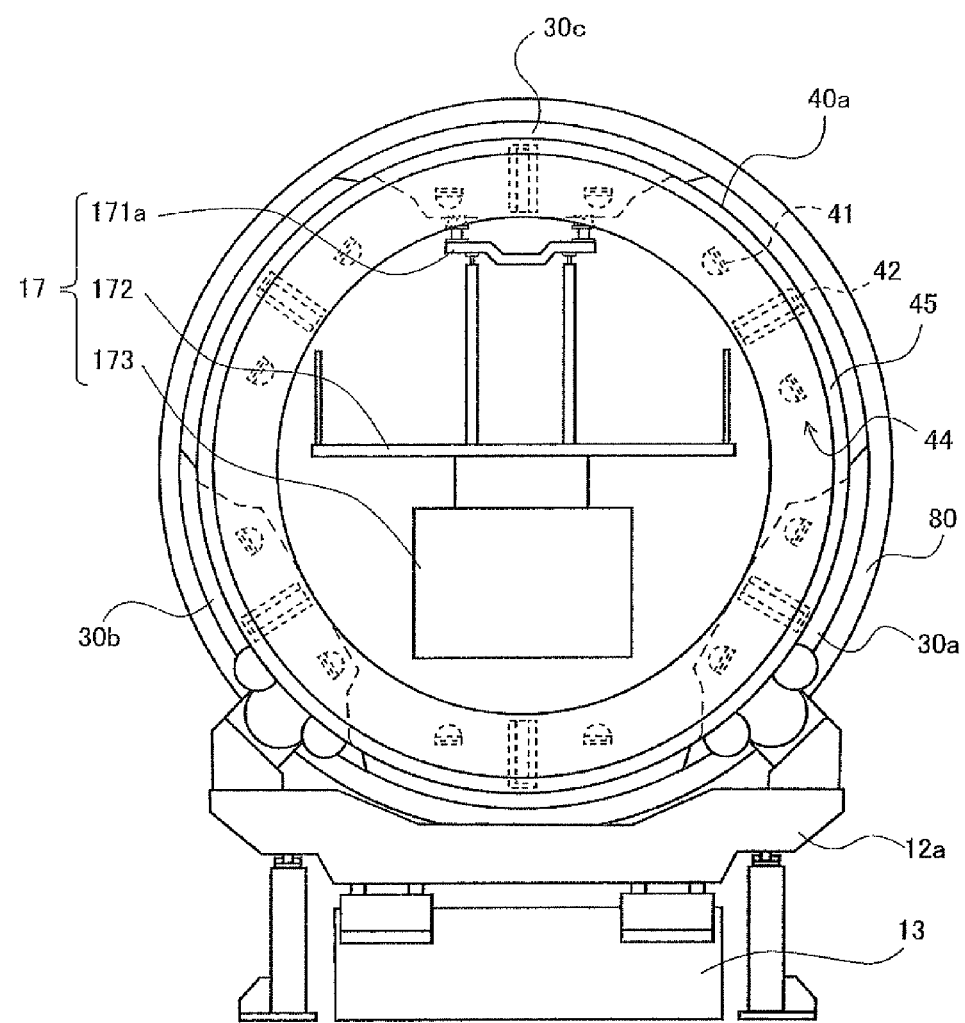
FIG. 18 is a schematic view showing a state in which the jack section is moved up and placed at a reverse side of a second segment of #6 of FIG. 4B to detach the second segment of #6 from the support rings.

According to this rotation, as shown in FIG. 18, the second segment 30c of #6 at a right and lower side in FIG. 17 moves to the uppermost portion.

Figure 19:
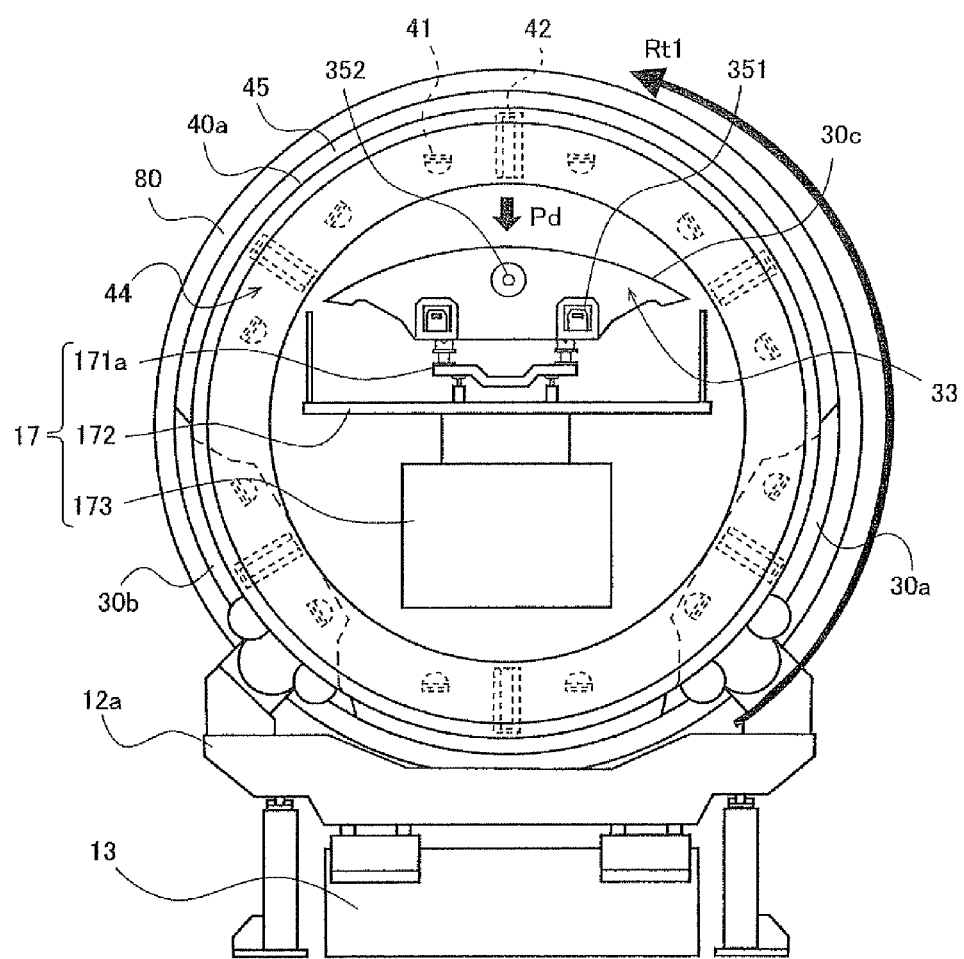
FIG. 19 is a schematic view showing a state in which the second segment of #6 of FIG. 4B is detached and the jack section is moved downward.

When the second segment 30c of #6 is positioned at the uppermost portion, the precision rail 17 performs the operation shown in FIG. 10B to FIG. 11A, and the jack sections 171a, 171b move up and contact the reverse side of the second segment 30c as shown in FIG. 18. In this state, the first segments 20a to 20c have been already detached. Therefore, the segment separating operation need not be performed, but the segment disengaging operation is performed immediately. The jack sections 171a, 171b are moved downward as indicated by the arrow Pd in FIG. 11A, and the four-corner position adjustment operation is performed according to the down movement. In this way, as shown in FIG. 19, the second segment 30c is detached smoothly without affecting the molded product 80 and the components in the vicinity of the second segment 30c (step P06-1 in FIG. 8, second segment detaching step). Then, the precision rail 17 performs the operation shown in FIG. 11B to FIG. 11C, and the second segment 30c is carried out from inside of the hollow space of the mold 10.

Then, as indicated by an arrow Rt1 of FIG. 19, the support ring 40a (and support ring 40b not shown) is rotated about 120 degrees by the ring rotation drive section 16 (step P06-3 in FIG. 8, rotation step). Thereby, the second segment 30a of #2 at right and lower side in FIG. 19 moves to the uppermost portion.

Figure 20:
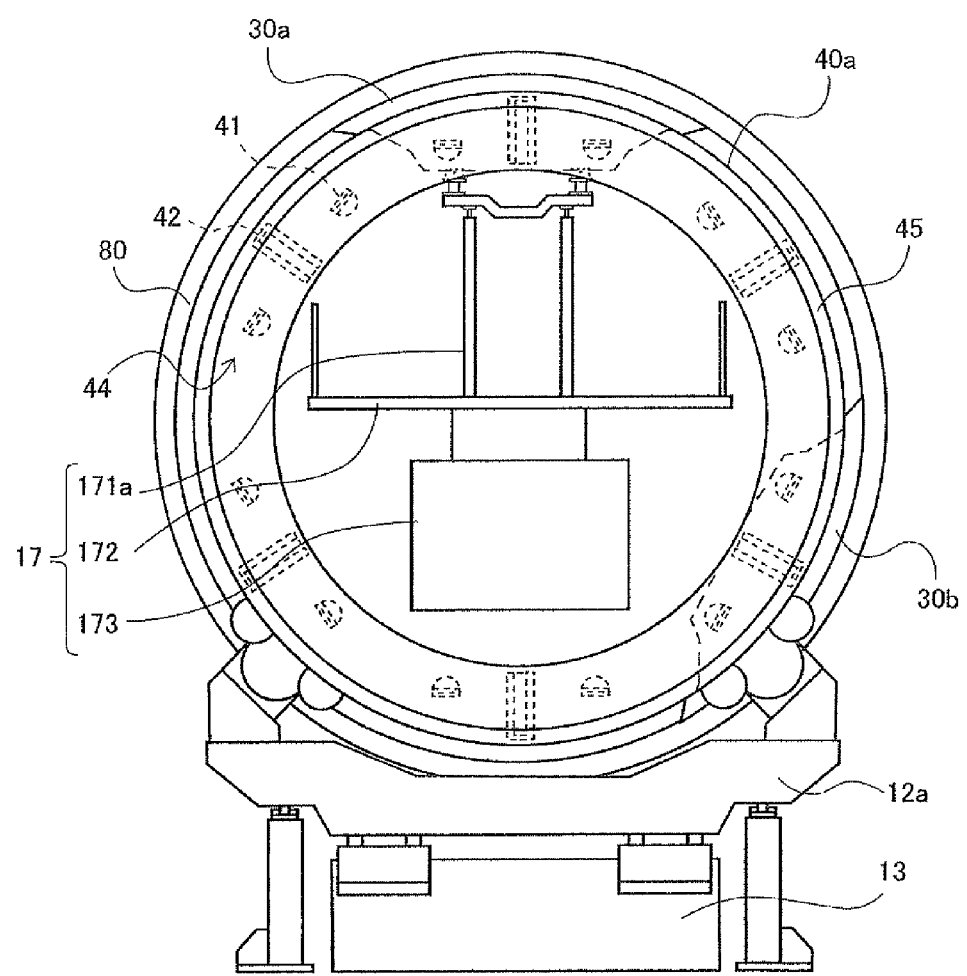
FIG. 20 is a schematic view showing a state in which the jack section is moved up and placed at a reverse side of a second segment of #2 of FIG. 4B to detach the second segment of #2 from the support rings.
Figure 21:
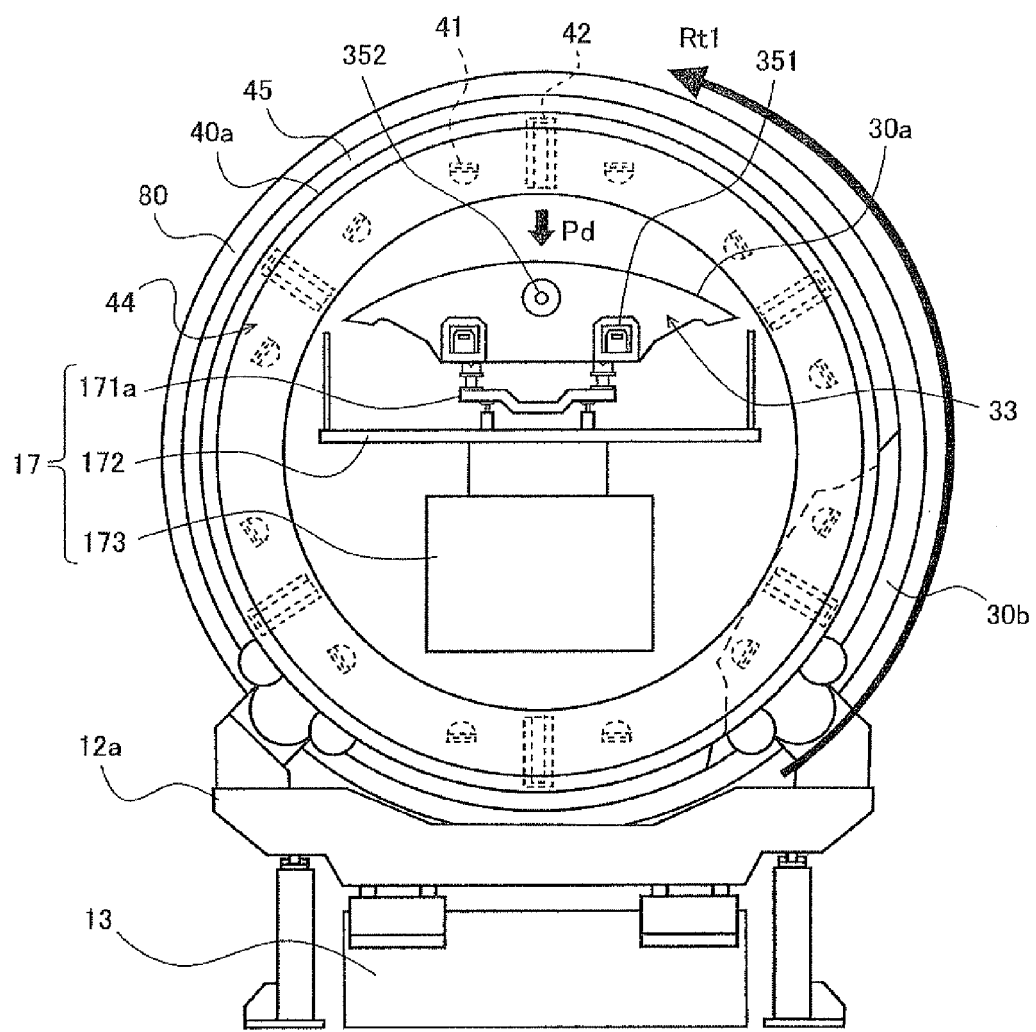
FIG. 21 is a schematic view showing a state in which the second segment of #2 of FIG. 4B is detached and the jack section is moved downward.

When the second segment 30a of #2 is positioned at the uppermost portion, the precision rail 17 performs the operation shown in FIG. 10B to FIG. 11A, and the jack sections 171a, 171b move up and contact the reverse side of the second segment 30a as shown in FIG. 20. Then, the segment disengaging operation is performed. The jack sections 171a, 171b are moved downward as indicated by the arrow Pd in FIG. 11A, and the four-corner position adjustment operation is performed according to the down movement. In this way, as shown in FIG. 21, the second segment 30a is detached smoothly (step P07-1 in FIG. 8, second segment detaching step). Then, the precision rail 17 performs the operation shown in FIG. 11B to FIG. 11C, and the second segment 30a is carried out from inside of the hollow space of the mold 10.

Then, as indicated by an arrow Rt1 of FIG. 21, the support ring 40a (and support ring 40b not shown) is rotated about 120 degrees by the ring rotation drive section 16 (step P07-2 in FIG. 8, rotation step). Thereby, the second segment 30b of #4 at right and lower side in FIG. 21 moves to the uppermost portion.

Figure 22:
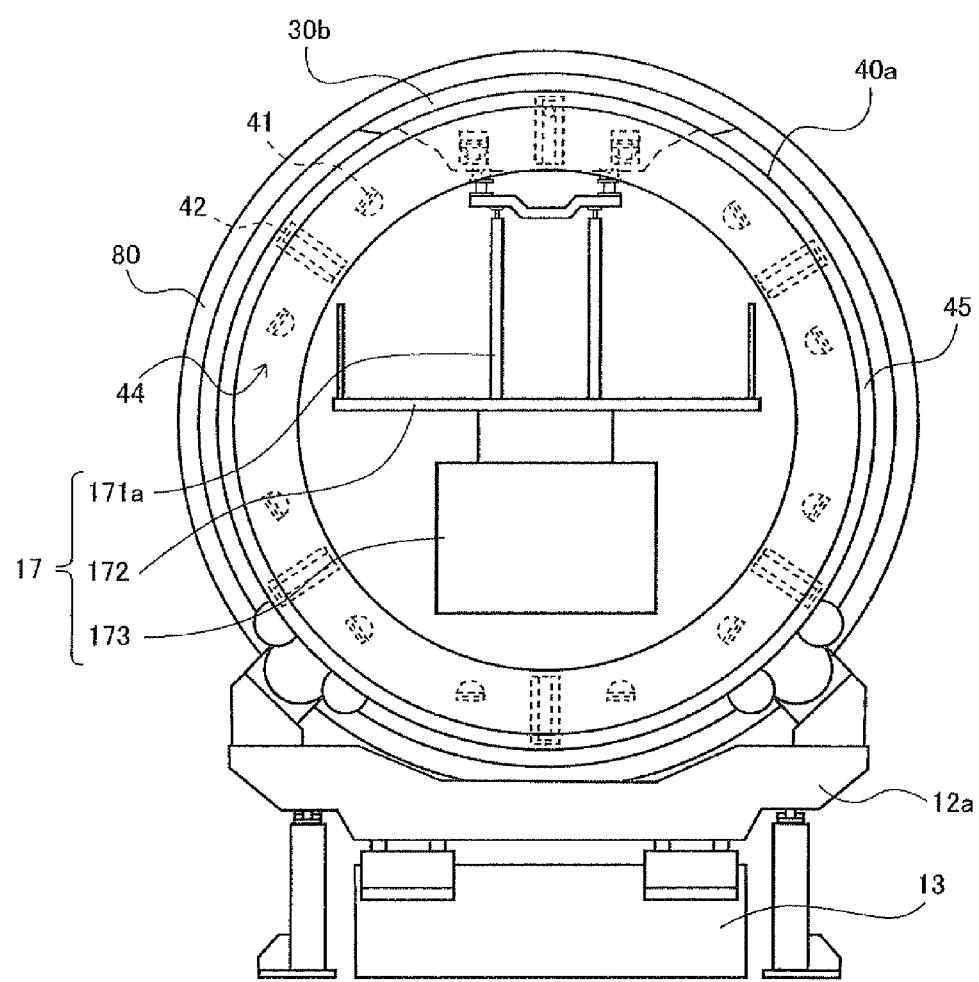
FIG. 22 is a schematic view showing a state in which the jack section is moved up and placed at a reverse side of a second segment of #4 of FIG. 4B to detach the second segment of #4 from the support rings.
Figure 23:
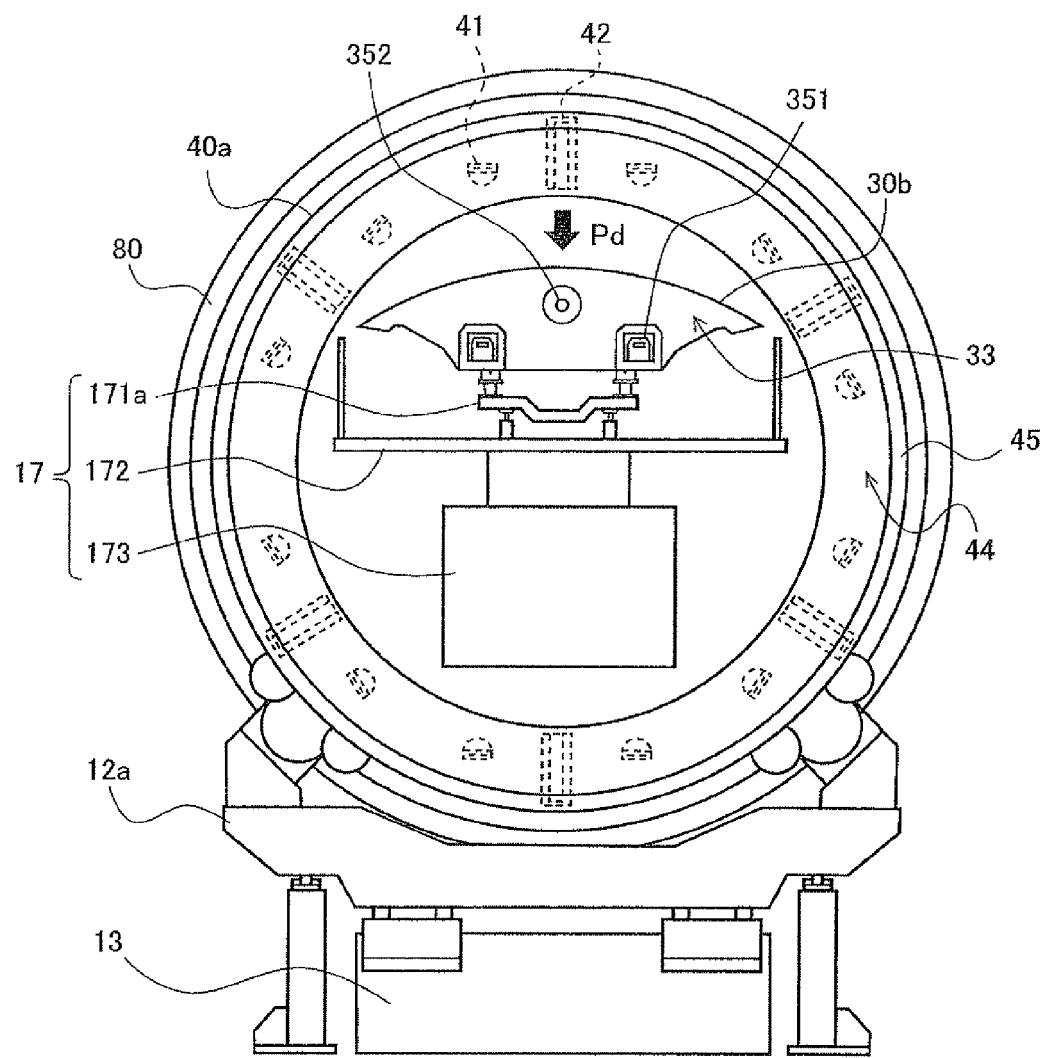
FIG. 23 is a schematic view showing a state in which the second segment of #4 of FIG. 4B is detached and the jack section is moved down.
Figure 24:
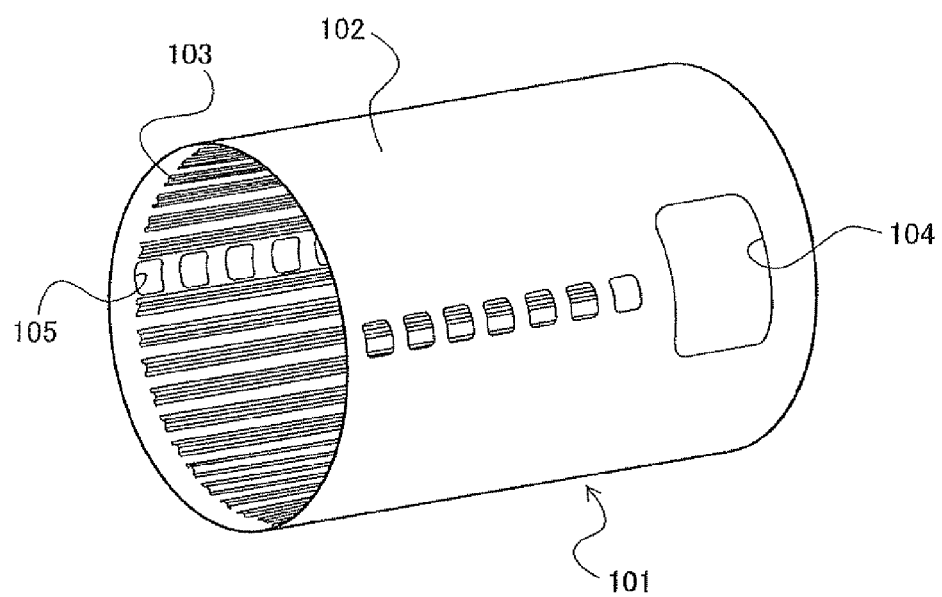
FIG. 24 is a perspective view showing an example of the configuration of a fuselage of an aircraft constructed as a one piece barrel (OPB) which is an example of a composite material structure.

When the second segment 30b of #4 is positioned at the uppermost portion, the precision rail 17 performs the operation shown in FIG. 10B to FIG. 11A, and the jack sections 171a, 171b move up and contact the reverse side of the second segment 30b as shown in FIG. 22. Then, the segment disengaging operation is performed. The jack sections 171a, 171b are moved downward as indicated by the arrow Pd in FIG. 11A, and the four-corner position adjustment operation is performed according to the down movement. In this way, as shown in FIG. 23, the second segment 30b is detached smoothly (step P08 in FIG. 8, second segment detaching step). Then, the precision rail 17 performs the operation shown in FIG. 11B and FIG. 11C, and the second segment 30b is carried out from inside of the hollow space of the mold 10.

As a result, all of the segments 20, 30 are detached from the support rings 40a, 40b, and disassembling of the mandrel 11 is completed. Thereafter, as described above, the rail body 173 is drawn out from the support rings 40a, 40b (step P09 in FIG. 8, rail draw-out step).

As described above, the disassembling method of the mandrel of the present embodiment, includes the rotation step of rotating the pair of support rings to position the segment which is a detached target at the uppermost portion, the segment being included in the mandrel adhesively attached with the composite material structure on the outer peripheral surface thereof. And, in this method, the segment which is the detached target and positioned at the uppermost portion, is moved downward along a vertical direction in a state, for example, in which it is inclined, between the pair of support rings, to a position inside of the mandrel, and then is carried out from between the support rings.

Therefore, when the segment which is the detached target is moved from the uppermost portion in a vertically downward direction, the detached segment is moved to inside of the mandrel. Therefore, the segment can be detached substantially without affecting the composite material structure provided on the outer peripheral surface of the mandrel. Inside of the mandrel, the segment is positioned between the pair of support rings. By horizontally moving the segment through the hollow space of the support rings, the segment can be carried out easily from between the support rings.

The segment which is the detached target is moved to the uppermost portion which is a determined location, by rotating the support rings. And, the segment which is the detached target is moved only in the vertical direction. This makes it possible to easily detach all of the plurality of segments in the same step. In addition, for example, by moving the segment which is the detached target in a state in which it is inclined, instead of vertically, the segment can be separated efficiently from the composite material structure adhesively attached to the mandrel, without deforming the composite material structure.

Modified Example

The disassembling method of the mandrel of the present invention is applicable to a mandrel 11 of another configuration as well as the mandrel 11 including three first segments 20 and three second segments 30, as described above. The disassembling method of the mandrel of the present invention may be suitably used, so long as the mandrel 11 which is to be assembled includes a plurality of segments having a substantially rectangular shape, and the segments are moved in the vertically downward direction and detached from the support rings, because the segment detaching step and the rotation step can be carried out.

Although the precision rail 17 of FIG. 5 includes the three conveyor sections 174a to 174c and the three jack sections 171a to 171c, the configuration of the precision rail 17 is not limited to this, so long as the precision rail 17 has segment support members capable of supporting at least portions in the vicinity of the four corners of the segment which is the detached target and displacing the portions independently in the vertical direction, between the support rings 40a, 40b, in a state in which the rail body 173 is inserted into the hollow space of the support rings 40a, 40b. Therefore, segment support members other than the rod-like segment support members (support rod members 171a-1, 171a-2, 171b-1, 171b-2) as shown in FIG. 6A may be used. Or, four jack sections may be provided to respectively support the portions in the vicinity of the four corners of the segment, or one jack section may support all portions in the vicinity of the four corners of the segment.

The mandrel assembling/disassembling apparatus of for use in the present invention is not limited to the precision rail 17 of FIG. 5, but another assembling/disassembling apparatus may be used. Nonetheless, the precision rail 17 of FIG. 5 is a particularly preferable assembling/disassembling apparatus.

The present invention is not limited to the above described embodiments, but may be changed in various ways within a scope of the claims, and embodiments obtained by suitably combining technical means disclosed in different embodiments or plural modified examples may be included in the technical scope of the present invention.

INDUSTRIAL APPLICABILITY

The present invention is widely used in fields of molding of composite material structures which are huge in size and have a substantially cylindrical shape, such as a fuselage of an aircraft.

The invention claimed is:

1. A disassembling apparatus of a mandrel, which disassembles the mandrel including a plurality of segments assembled in a tubular shape, the plurality of segments having a substantially rectangular shape and being parts into which the mandrel is divided along a center axis direction, the mandrel being in a state in which the segments are joined together between a pair of support tings facing each other, the segments are each fastened to the support rings to form the tubular shape, and the mandrel is adhesively attached with a composite material structure on an outer peripheral surface thereof, the apparatus comprising:
   a rail body inserted into inside of the mandrel through a hollow space of the pair of support rings;
   a ring rotation drive section for rotating each of the support rings to rotate the mandrel to position one of the segments which is a detached target, at an uppermost portion of each of the support rings;
   a vertical movement mechanism which is provided on the rail body and configured to lift up the segment which is the detached target, which is positioned at the uppermost portion, along a vertical direction, support the segment, then move the segment detached from the support rings, in a vertically downward direction, and position the segment inside of the mandrel; and
   a horizontal movement mechanism which is provided with the rail body and configured to horizontally move the segment from a rear end of the rail body toward a tip end of the rail body to carry out the segment from between the pair of support rings.

2. The disassembling apparatus of the mandrel according to claim 1,
   wherein the vertical movement mechanism includes segment support members which support at least portions in the vicinity of four corners of the segment having the substantially rectangular shape and displace the portions independently along the vertical direction, between the support rings, in a state in which the rail body is inserted into the hollow space of the support rings.

3. The disassembling apparatus of the mandrel according to claim 2,
   wherein the segment support members of the vertical movement mechanism include the segment support member which supports one end portion of the segment which is the detached target and the segment support member which supports an opposite end portion of the segment which is the detached target, and
   wherein the segment support member supporting one end portion of the segment which is the detached target is displaced downward before the segment support member supporting the opposite end portion of the segment which is the detached target such that the segment which is the detached target is inclined, to separate the segment from an inner surface of the composite material structure.

4. The disassembling apparatus of the mandrel according to claim 1, comprising:
   a rail movement support table for supporting the rail body; and
   a pair of rail support work tables for supporting the rail body, the pair of support rings being placed between the pair of rail support work tables;
   wherein the rail movement support table and the rail support work tables include a movement support mechanism which supports the rail body such that the rail body is movable.

5. The disassembling apparatus of the mandrel according to claim 4,
   a carriage on which the pair of support rings are placed;
   wherein the pair of rail support work tables are configured such that the support rings and the carriage are placed between the pair of rail support work tables, and the rail support work tables support the support rings together with the carriage.

6. The disassembling apparatus of the mandrel according to claim 4, further comprising:
   a cradle for supporting each of the support rings from below on at least two locations sandwiching a vertical line passing through a center axis of the support ring;
   wherein the rail support; work table supports each of the support rings on an upper portion of the rail support work table such that movement of the support ring in a direction of the center axis is restricted.

7. The disassembling apparatus of the mandrel according to claim 1,
   wherein the ring rotation drive section includes a position detector section which detects that the segment which is the detached target is positioned at an uppermost portion of each of the support rings.

8. The disassembling apparatus of the mandrel according to claim 1,
   wherein the plurality of segments include a first segment and a second segment which are different in shape, and an obverse surface of the second segment, which is a part of an outer peripheral surface of the mandrel, has a greater area than all obverse surface of the first segment, which is a part of the outer peripheral surface of the mandrel, and
   wherein after all of the first segments are detached from the mandrel and carried out from between the pail of support rings with the horizontal movement mechanism, the second segment is detached.

* * * * *